(12) United States Patent
Gnedenko et al.

(10) Patent No.: US 7,465,843 B2
(45) Date of Patent: Dec. 16, 2008

(54) RECYCLING SYSTEM FOR A WASTE PROCESSING PLANT

(75) Inventors: Valeri G Gnedenko, Moscow (RU); Alexander Suris, Moscow (RU); David Pegaz, Netanya (IL)

(73) Assignee: E.E.R. Environmental Energy Resources (Israe) Ltd., Ramat-Gan (IL)

( * ) Notice: Subject to any disclaimer, the term of this patent is extended or adjusted under 35 U.S.C. 154(b) by 434 days.

(21) Appl. No.: 10/504,862

(22) PCT Filed: Feb. 16, 2003

(86) PCT No.: PCT/IL03/00118

§ 371 (c)(1),
(2), (4) Date: Mar. 24, 2005

(87) PCT Pub. No.: WO03/069227

PCT Pub. Date: Aug. 21, 2003

(65) Prior Publication Data

US 2005/0166810 A1 Aug. 4, 2005

(30) Foreign Application Priority Data

Feb. 18, 2002 (IL) .................................... 148223

(51) Int. Cl.
C10G 1/00 (2006.01)
G21F 9/00 (2006.01)
A62D 3/00 (2007.01)
A62D 3/32 (2007.01)
H05F 3/00 (2006.01)

(52) U.S. Cl. ........................ 585/242; 588/18; 588/19; 588/311; 588/314; 204/164

(58) Field of Classification Search ................. 585/242; 588/18, 19, 314, 311; 204/164; 110/185, 110/203, 235, 165 R, 165 A, 208, 216, 204; 48/202, 206, 209, 317
See application file for complete search history.

(56) References Cited

U.S. PATENT DOCUMENTS

| | | | |
|---|---|---|---|
| 4,052,173 A * | 10/1977 | Schulz | 48/202 |
| 4,291,636 A | 9/1981 | Bergsten et al. | |
| 4,765,911 A * | 8/1988 | Rasmussen | 210/710 |
| 4,770,109 A * | 9/1988 | Schlienger | 110/247 |
| 4,989,522 A * | 2/1991 | Cline et al. | 110/250 |
| 5,143,000 A * | 9/1992 | Camacho | 110/250 |

(Continued)

FOREIGN PATENT DOCUMENTS

CH 691 507 A5 7/2001

(Continued)

OTHER PUBLICATIONS

Iddles, D. et al, "The Plasma Treatment of Incinerator Ashes" Tetronics Limited. [online]. Sep. 4, 2001, [retrieved on Nov. 29, 2004]. Retrieved from Internet <URL:http://www.tetronics.com/pdffiles/etisfile.pdf>.

*Primary Examiner*—Walter D Griffin
*Assistant Examiner*—Huy-Tram Nguyen
(74) *Attorney, Agent, or Firm*—Browdy and Neimark, P.L.L.C.

(57) ABSTRACT

A recycling system for a waste converting apparatus collects residues from a post-processing means and re-introduces the residues into the apparatus such that the residues are exposed to the high temperature zone thereof.

60 Claims, 10 Drawing Sheets

U.S. PATENT DOCUMENTS

| | | | |
|---|---|---|---|
| 5,319,176 A * | 6/1994 | Alvi et al. | 588/311 |
| 5,439,498 A * | 8/1995 | Bitler et al. | 75/10.19 |
| 5,451,738 A * | 9/1995 | Alvi et al. | 219/121.59 |
| 5,496,392 A * | 3/1996 | Sims et al. | 75/414 |
| 5,505,145 A * | 4/1996 | Gross et al. | 110/248 |
| 5,534,659 A * | 7/1996 | Springer et al. | 588/311 |
| 5,657,704 A * | 8/1997 | Schueler | 110/106 |
| 5,662,050 A * | 9/1997 | Angelo et al. | 110/246 |
| 5,809,911 A * | 9/1998 | Feizollahi | 110/346 |
| 6,250,236 B1 * | 6/2001 | Feizollahi | 110/346 |
| 6,311,629 B1 * | 11/2001 | Marschner et al. | 110/341 |
| 6,551,563 B1 * | 4/2003 | Kado et al. | 422/186.21 |
| 2002/0006372 A1 | 1/2002 | Sugimoto et al. | |

FOREIGN PATENT DOCUMENTS

| | | |
|---|---|---|
| DE | 43 33 510 | 1/1995 |
| EP | 324 454 A1 | 7/1989 |
| FR | 2691524 | 11/1993 |
| JP | 2001-304534 | 10/2001 |
| WO | WO 89/09253 A1 | 10/1989 |
| WO | WO 99/23419 A1 | 5/1999 |

* cited by examiner

US 7,465,843 B2

RECYCLING SYSTEM FOR A WASTE PROCESSING PLANT

TECHNICAL FIELD

The present invention relates to a plant or apparatus for the conversion of waste, including the processing, treatment or disposal of waste. In particular, the present invention is directed to an improved arrangement for treating residues, including fly ash and the like generated by such a plant, and for reducing the levels of dangerous emissions and the volume of residue which are eventually output by the plant.

BACKGROUND

The processing of waste including municipal waste, medical waste, toxic and radioactive waste by means of plasma-torch based waste processing plants is well known. Referring to FIG. 1, a typical prior art plasma-based processing plant (1) comprises a processing chamber (10) typically in the form of a vertical shaft, in which typically solid, and also mixed (i.e., generally, solid plus liquid and/or semiliquid), waste (20) is introduced at the upper end thereof via a waste inlet means comprising an air lock arrangement (30). One or a plurality of plasma torches (40) at the lower end of the chamber (10) heats the column (35) of waste in the chamber (10), converting the waste into gases that are channeled off via outlet (50), and a liquid material (38) (typically molten metals and/or slag) which is periodically or continuously collected at the lower end of the chamber (10) via reservoir (60). Oxidising gases or fluids, such as air, oxygen or steam (70) may be provided at the lower end of the chamber (10) to convert char residues comprising carbon, produced in the processing of organic waste, into useful product gases such as CO and $H_2$, for example. A similar arrangement for dealing with solid waste is described in U.S. Pat. No. 5,143,000, the contents of which are incorporated herein by reference thereto.

During operation of such a plant (1), products of the waste gasification are generated, including gases, liquid droplets and solid particles, which are removed from the chamber (10) by the outflow of product gases therefrom via outlet (50).

The product gases include gases such as for example hydrocarbons with general formula CnHm, and also CO, $H_2$, $N_2$, $CO_2$, $H_2O$, HCl, $H_2S$, $NH_3$, HF and other gases.

The liquid droplets may contain a variety of chemical compounds, and the physical form of the liquid may range from a tar-like substance to a light water soluble distillate.

The solid products may consist of small particles of waste (which are carried out by gas via outlet (50)) and of small particles of solid components which were formed as vapor in the lower (hotter) part of reactor or chamber (10), and then were condensed in the upper part of the chamber (10). These products may also include dioxins produced from the raw material in the waste. These solid particles which are carried out from the chamber (10) are typically known as "fly ash". The greater the speed of the product gases leaving the chamber (10), the greater the amount of fly ash that is removed from the chamber (10). This fly ash generally comprises organic and inorganic compounds. Organic compounds may include, for example, components of paper, textile and other materials, which in turn may also comprise some proportion of inorganic materials too. For example, inorganic matter may constitute more than 20% of paper used in some paper products, the inorganic matter originating from the mineral fillers and coating pigments, including for example calcium carbonate, china clay and metal oxides, used to provide colour inks in the printing process. The inorganic compounds may also include different salts and metals, other than just oxides thereof, and may form part of raw waste material and/or may be formed during reactions at the lower part of chamber (10).

Typically, the product gases including the liquid and solid products entrained therewith are channeled off to a suitable post-processing means (2) comprised in the plant (1) and operatively connected to the chamber (10) via outlet (50), illustrated in FIGS. 2(a), 2(b), 3(a) and 3(b). The actual form of the post-processing means (2) will generally depend on the specific use of the plant (1) and its size/capacity.

For example, as illustrated in FIG. 2(a), in some large-scale plants (1), the post-processing means (2) may comprise an afterburner (3) and an energy generating system (4), followed by a gas cleaning system (5) and stack (6). The energy generating system (4) is adapted to produce (typically electrical) energy, which may be used to run the plant (1) and/or exported. As illustrated in FIG. 2(b), in smaller-scale plants (1), such as for example those used for the treatment of medical or other hazardous waste, may not provide sufficient product gases to justify an energy generating system, which is therefore replaced with a combustion products cooling system (9).

In the plants illustrated in FIG. 2(a) and FIG. 2(b), the gasification products generated in, and channeled off from, the chamber (10) are directed into the afterburner (3) wherein all organic materials (in gaseous, liquid or solid form) are combusted, forming $CO_2$, $H_2O$, $N_2$, $SO_x$, HCl, HF, $P_4O_{10}$, $NO_x$ and other combustion products, and wherein the inorganic materials form oxides and salts. Depending on the composition of the original waste, and if temperature in the afterburner (3) is not high enough and/or residence time of gases therein is small, dioxins may be formed. In order to eliminate dioxins, the combustion temperature needs to be higher than 850° C. (or higher than 1200° C. if the amount of chlorine in the waste is greater than about 1% by mass), and residence time in the afterburner (3) also needs to exceed 2 seconds. Under these minimal conditions, dioxins (that may exist in the gas products introduced into the afterburner (3)) will be oxidized, and thus destroyed.

While dioxins may exists in the waste materials before processing, in prior art apparatuses the major proportion of dioxins is formed during combustion of materials, including chlorine-containing organic materials, especially if the combustion temperature is low and the residence time in the afterburner is also low. Further, fly ash also tends to contain some metal compounds, especially copper-containing compounds which act as catalysts helping to form dioxins which are adsorbed in the fly ash, leading to high levels of toxicity in the fly ash formed with prior art apparatuses. In any case, even if the combustion temperature and residence time is sufficiently high to prevent the formation of dioxins in the afterburner, enough dioxins may still be formed during the cooling of combustion products in the boiler. This is particularly so if some of the organic materials in the waste were not fully combusted in the afterburner. To prevent this production of dioxins, it is necessary to have a high combustion temperature and to quench the products of combustion.

Alternatively, and as illustrated in FIG. 3(a) and FIG. 3(b), the post-processing means (2) may comprise a gas cleaning system (5'), for removing from the product gases leaving the chamber (10) toxic and corrosive components, such as for example HCl, HF, $H_2S$ and so on, and also including Cl, S, F and others, and also oils, tars, dust, carried with the product gases. The gas cleaning system (5') is connected to a waste water treatment system (7), which also cools and cleans the water before recycling. The clean fuel gas leaving the gas cleaning system (5'), typically comprising CO, $H_2$, $N_2$, $CO_2$, $CH_4$ is channeled to a suitable energy generating system (4) operatively connected to a stack (6), as illustrated in FIG. 3(a). In the energy generating system (4), the fuel gases are combusted in a gas turbine arrangement, which is operatively connected to an electric generator, and typically also to an air compressor. Hot combustion products (at a temperature of about 450° C. to 550° C.) from the gas turbine are directed to a boiler where steam is produced for a steam turbine, which when coupled with an electric generator also generates electrical power. Such an electrical power generating scheme is known as a "combined cycle" and is highly efficient. Alternatively, and as illustrated in FIG. 3(b), the clean fuel gas may be sold to customers (8), for the cement plants, for example, or other uses. For the types of systems illustrated in FIGS. 3(a) and 3(b), chlorine is usually taken out of from the products in the cleaning system before they are directed to the combustion system or sold. Thus, dioxins are not generally formed in such systems.

Depending on the type of post-processing means (2) used in the plant (1), different residues are precipitated in the post-processing means (2), these residues being non-gaseous, and typically solids and/or liquids and/or mixtures thereof. Although the exact composition and physical form of these residues depends on the type of post-processing means (2) and on the composition of the waste processed by the chamber (10), these residues may be divided by any suitable categories, including for example, their physical state (powder, sludge or liquid, for example), by their chemical composition, by the size of particles, and so on. Herein, these residues are conveniently categorized into two types of residues, herein denoted Residues 1 (R1) and Residues 2 (R2), as defined hereinbelow.

Residues 1 (R1) may be defined as the residues that are formed only from the materials exiting from the chamber (10) via the gas outlet (50), and may include the products of their subsequent combustion in the post-processing means (2) (such as for example provided in the apparatuses illustrated in FIGS. 2(a) and 2(b)), and may further include products produced in a gas cleaning means such as a scrubber, for example, where only water (without additives) is used in the scrubber (such as for example provided in the apparatuses illustrated in FIGS. 3(a) and 3(b)).

Thus, Residues 1 (R1) may include mostly components of the treated waste and condensed vapors which are precipitated in the waste water treatment system (7) in the plants illustrated in FIGS. 3(a) and 3(b), that is, when only water without additives is used in first portion (7') of the waste water treatment system (7). Such Residues (1) may include solid particles and tar (which is present in the products exiting the processing chamber), some water and some products formed from the reaction between some materials leaving the processing chamber and water. For example, the product gases may include hydrogen chloride gas, which may be diluted in the scrubber and form hydrochloric acid, which may then react with some solid particles and form salts, some of them soluble such as NaCl. Scrubber water may react with some components in the solid particles and may form hydroxides, and thus some of these salts and hydroxides may be recycled together with tars and other solids. In such cases, the Residues 1 (R1) may be in the form of a sludge, mixed with water from the waste water treatment system (7). Alternatively, the Residues 1 (R1) may include the materials forming after the oxidation in the afterburner (3), such as used in the plants illustrated in FIGS. 2(a) and 2(b), of the raw materials and condensed vapor carried out from the processing chamber. In such plants, some oxides and salts may be present in the raw material, i.e., the waste and additives which are fed to the processing chamber, and are then carried out of the chamber; some such materials may not be changed chemically in the afterburner. On the other hand, some materials may be changed chemically in the afterburner, for example metal to metal oxides, chlorides and so on, depending on the composition of the waste and conditions in the chamber and the afterburner.

Thus, Residues 1 (R1) are formed when the materials exiting the processing chamber via the gas outlet (50) are treated in the post-processing means (2) only with air (and/or oxygen) and/or by water, but without any additives. Thus, if additives or special reagents are used in the post-processing means (2), then Residues (2) are formed instead, as will be explained further hereinbelow.

Residues 2 (R2), on the other hand, while possibly also including Residues 1 (R1), are characterized in also including materials which originate from the input of additional substances into the post-processing means (2), in particular into the gas cleaning systems, and thus may include the actual additives and/or reagents used in the post-processing means (2), as well as the products of their reactions therein with materials carried from the processing chamber (10), and typically may be in the form of a sludge. Such Residues 2 (R2) may include, for the apparatuses illustrated in FIGS. 2(a) and 2(b), reagents such as $Ca(OH)_2$, $Na_2CO_3$, NaOH, active carbon and others, which are used for binding acid gases (including, for example, $SO_x$, HCl, HF, $P_4O_{10}$), and for trapping or adsorbing dioxins and heavy metal compounds. Products of reactions may include $CaCl_2$, $CaSO_4$, $Ca_3(PO_4)_2$, CaF and/or NaCl, $Na_2SO_4$, $Na_3PO_4$, and others. Thus, Residues 2 (R2) may include some oxides and salts (which did not precipitate previously), reagents (since they are usually provided in amounts greater than required), and products of reaction. In the apparatuses illustrated in FIG. 3(a) and FIG. 3(b), part of the waste water is taken out from the first part (7') of system (7), and is directed to the second part (7') of the cleaning system (7) for special treatment by adding reagents, and by providing filtration and evaporation of solutions. In the second part (7"), Residues (2) are formed, and heavy metals may be transformed into solid hydroxides (for example, $Cu(OH)_2$, $Mn(OH)_2$, and others), and sulphides, including PbS, HgS and others. Chlorine may be transformed into dry NaCl.

Thus, in the afterburner (3) of FIG. 2(a), some dust (products of combustion) is precipitated as Residue 1 (R1). The products of combustion, including gases and dust, are directed to a boiler comprised in the energy generating system (4). Typically, steam is produced in the boiler, though at times hot water may be provided instead for customers, and the steam may be sold or may be used in steam turbine (with electric generator) for the generation of electricity. In the boiler some dust is precipitated too (i.e., as Residue 1 (R1)). Similarly, in the cooling system (9) of FIG. 2(b), some dust is also precipitated (i.e., as Residue 1 (R1)), which are also the products of combustion. In the plants illustrated in FIGS. 2(a) and 2(b), Residue 1 (R1) is typically in powder form.

Referring to FIG. 2(a), after the boiler in energy generating system (4), the products of combustion (including gases and dust) are directed to the gas cleaning system (5). Reagents, including for example $Ca(OH)_2$, $Na_2CO_3$, NaOH, active carbon and/or other reagents, are used here for binding the acid gases, which may include $SO_2$, HCl, HF, $P_4O_{10}$. Products of reaction between the reagents and the acid gases are formed, including, for example, $CaCl_2$, $CaSO_4$, $Ca_3(PO_4)_2$, CaF and/or NaCl, $Na_2SO_4$, $Na_3PO_4$ and others. Hence, Residues 2 (R2) include some oxides and salts (which did not precipitate previously in the plant (1)), some quantity of reagents (since they are normally fed to the post-processing means (2) in amounts greater than the nominal proportions required), and products of reaction. Residue 2 (R2) may be in the form of a powder or sludge depending on the type of gas cleaning system (5) that is used.

For example, a "dry" gas cleaning system (5) suitable for the plant (1) illustrated in FIG. 2(a) may include a semi-dry scrubber, into which is fed a suspension of $Ca(OH)_2$ in water for binding the acid gases. Water is subsequently evaporated fully, and thus only gases, products $Ca(OH)_2$, $CaCl_2$, $CaSO_4$, $Ca_3(PO_4)_2$, in powder form, and other dust (which did not precipitate in the boiler) exit the scrubber. After the scrubber there is a reactor-adsorber arrangement, wherein a mixture of powders of $Ca(OH)_2$ and powdered activated carbon (PAC) are fed. These powdered adsorbants have very large specific surface values (typically carbon>750 $m^2/g$; $Ca(OH)_2$>30 $m^2/g$), and the $Ca(OH)_2$ may adsorb the remaining acid gases, while the PAC adsorbs dioxins and components containing heavy metals. After the reactor-adsorber there is a fabric filter arrangement where Residues 2 (R2) may be precipitated, including $Ca(OH)_2$, active carbon, dioxins, some oxides and salts (which did not precipitate before), and products of reaction ($CaCl_2$, $CaSO_4$, $Ca_3(PO_4)_2$ and other substances). Essentially, gas carrying dust, which includes toxic components such as dioxins, heavy metals and their oxides and salts, is filtered through the layer of dust precipitated on the fabric of the bags and including adsorbents such as for example $Ca(OH)_2$ and PAC, and the toxic components are adsorbed and thus precipitate out of the carrier gas. The clean gas obtained after filtration is directed to an exhauster and then to the stack (6) for expulsion into the atmosphere. Residues 2 (R2) obtained from such a cleaning system (in particular from the bag filter arrangement) do not include liquid, and thus such systems are known as "dry" cleaning systems. Residues 2 (R2) are very toxic and may include dioxins, compounds of heavy metals and $Ca(OH)_2$, active carbon, some oxides and salts (which did not precipitate previously), products of reaction (such as, for example, $CaCl_2$, $CaSO_4$, $Ca_3(PO_4)_2$ and other substances). However, since this Residue 2 (R2) is hygroscopic (especially the $CaCl_2$ portion thereof), it may absorb water from the water vapour that is generated along with other combustion products, and thus may have a sludge-type consistency. Accordingly, in many instances tubes which are used for transporting this Residue 2 (R2) in the gas cleaning system (5) are heated to enable the Residue 2 (R2) to dry.

On the other hand, and referring to the post-processing means (2) illustrated in FIG. 2(b), atomized water, or water suspension with $Ca(OH)_2$, or water solution of $Na_2CO_3$ or of NaOH may be used in the cooling system (9). When water is used, cooling system (9) acts only as a cooler, and Residues 1 (R1) are precipitated therein. When water with reagents is used (for binding the acid gases —$SO_x$, HC1, HF, $P_4O_{10}$) the cooling system (9) also functions as a cooler, but additionally also forms simultaneously part of the cleaning system. In the latter case, Residues 2 (R2) are precipitated, and a reactor adsorber and bag filter arrangement may be provided, as described with respect to the arrangement of FIG. 2(a), mutatis mutandis.

Referring to the post-processing means (2) of the plants illustrated in FIG. 3(a) and FIG. 3(b), the gas cleaning system (5') may comprise, for example, scrubbers and other means wherein the following materials are removed from the product gases: $H_2O$, HCl, $H_2S$, $NH_3$, HF, oils, tars, dust and others. Waste water or waste aqueous solutions previously used in scrubber is transported to a waste water treatment system (7) for cooling and cleaning before being recycled to the gas cleaning system (5). Residues 1 (R1), comprising oils, tars and dust including fly ash, and even some reagents and products of reaction, are precipitated in a first portion (7') of the waste water treatment system (7), and the recycled waste water is reintroduced into the gas cleaning system (5'). Part of waste water is taken out from the first part (7') of the waste water treatment system (7) and is channeled to the second part (7") thereof. This water contains an accumulation of components including heavy metals, chlorine compounds and others, and in the second part (7") of the waste water recycling system (7") heavy metals are transformed typically to solid hydroxides (such as, for example, $Cu(OH)_2$, $Mn(OH)_2$ and others) and to solid sulphides (such as, for example, PbS, HgS and others), and concurrently, Chlorine may be transformed in dry NaCl, for example. These solid residues are Residue 2 (R2).

Thus, in essence, such plasma-based processing plants of the art generate Residues 1 (R1) and Residues (R2), regardless of the specific details of the post-processing means (2), and a problem commonly encountered relating to the operation of such plasma-based processing plants (such as for example each one of the four prior art cases exemplified above) is the safe and economic disposal of the Residues 1 (R1) and Residues 2 (R2) obtained with the prior art post-processing means.

Particularly where the waste has a large proportion of heavy metals, dioxins and many other volatile materials (including some metals, metal oxides, chlorides, fluorides and others e.g., Cd, Hg, As, Zn, CdO, $K_2O$, $Na_2O$, CuO, CuCl, $CdCl_2$, $HgCl_2$, $PbCl_2$, $AsCl_3$, $NiCl_2$, $ZnCl_2$, $MnCl_2$, and others) that have low boiling points and are thus vaporized in the chamber (10), these materials are entrained with the product gases, rather than being included in the slag. These volatile components will be eventually accumulated in the post-processing means (2), and particularly in the gas cleaning system, and can not be treated further in the prior art plants. As this can lead to unacceptable high levels of toxic components delivered to the stack (6), these residues must be removed for disposal, typically by land filling in the prior art.

In some prior art plants, the problem of disposal of Residues 1 (R1) is addressed by mixing the Residues 1 (R1) with water, drying this mixture and granulating the same. The granules are then fed to a separate specialized and dedicated plasma-based processing plant. However, this does little to solve the problem, since because of their composition and structure many granules are crushed during feeding and may be carried out by product gases again, or may be vaporized before reaching the hot zone of the plant, which thus results in a need for further, and possibly endless, recycling.

In another system ("The Plasma Treatment of Incinerator Ashes", by D. M. Iddles, C. D. Chapman, A. J. Forde, C. P. Heanly, of Tetronics Ltd.) fly ash obtained from reciprocating grate incinerator and a fluidised bed was fed to an apparatus via the upper end of the apparatus. The apparatus is described as having a twin DC plasma arc heating system, such as to melt the feed. The apparatus produces a slag which may be a useful vitrified product, organic species are claimed to be destroyed, and gas treatment is required to deal with the gases produced. While such an apparatus may be an improvement over other prior art systems, the fly ash has to be separately transported and fed into the apparatus, adding cost and complexity to the conversion of the original municipal solid waste (MSW) or the sewage sludge waste (SSW). There is no suggestion that such an apparatus should be incorporated in a regular waste processing plant. Nevertheless, even if such a combination were formed, the apparatus would still add significant operating costs due to the plasma torches and so on. Further, in the apparatus disclosed, fly ash may still be entrained with product gases and removed from the processing chamber, and similarly volatile components in the fly ash are vaporized before reaching the hot zone, since the fly ash is introduced at the cooler end of the apparatus. Such prior art systems are also not suitable for dealing with Residues 2 (R2), in any case. The high temperatures of the apparatus destroys sulphates such as $CaSO_4$ and $Na_2SO_4$ to $SO_x$ again. The SOx then needs to be bound again in a special gas cleaning system, where additional residues will be formed.

It is therefore an aim of the present invention to provide a system and method for dealing with non-gaseous residues produced in a waste converting plant, in particular plasma-torch based plants, which overcomes the limitations of prior art plants.

It is another aim of the present invention to provide such a system and method that may be incorporated into a municipal solid waste processing apparatus.

It is another aim of the present invention to provide such a system that is relatively simple mechanically and thus economic to incorporate into a processing plant design.

It is another aim of the present invention to provide such a system incorporated as an integral part of a plasma-torch based type waste converter.

It is also an aim of the present invention to provide such a system that is readily retrofittable with respect to at least some existing plasma-torch based waste converters.

The present invention achieves these and other aims by providing a system and method for redirecting non-gaseous residues, in particular Residues 1 and/or Residues 2, directly to the hotter parts of the processing chamber. In one embodiment this is accomplished by providing a reservoir for collecting residues precipitated by the post-processing means, and providing communication between the reservoir and the hotter part of the processing chamber by means of a direct connecting conduit. Means are then provided for transporting the residues into the chamber. In another embodiment, the residues are mixed with suitable additives, including slag produced by the processing chamber, and cementing adhesive or the like to form composite pellets or granules which are designed to be stable in the upper cooler part of the processing chamber. These pellets are then fed to the processing chamber via the top thereof with or without other regular waste. However, the majority of the residues inside the granules cannot be carried out by gases from the chamber or be chemically destroyed until the granules reach the high temperature regions of the chamber. Thereat, the residues inside the composite pellets are melted and/or possibly interact with slag and/or with additives inside the granules. So, part of the toxic components of residue will be destroyed, and part will be included in the molten slag, collected via a suitable reservoir. In other embodiments, both types of systems may be incorporated, and operated, separately or jointly.

The effect of introducing the residues into the high temperature zone of the processing chamber is to avoid some of the toxic compounds merely exiting the processing chamber relatively intact. Rather, some of the metal oxides which have low boiling points may interact with the slag and/or additives existing in the granules at the lower end of the processing chamber, forming solid solutions which have a much higher melting point than that of its components. In this way, at least some of the heavy metals (including for example Cd, Zn and Pb) may be included in the vitrified slag, and thus prevented from contaminating the environment either as part of the gases leaving the stack (6) or in by way of burial of residues in a landfill. Similarly, dioxins comprised in the residues, when introduced to the high temperature zone of the chamber (10), are reduced to HCl, CO and hydrocarbons, which are subsequently pyrolysed and oxidized in the gasification zone of the chamber (10) to generate CO.

It is important to note that the present invention comprises a waste processing chamber that is adapted to accommodate a column of waste and to enable the waste to migrate through the chamber in a downstream direction. The column of waste between the hot zone (that is provided by the plasma torches) and the gas outlet provides a tortuous matrix structure for gases that are formed in the gasification process, so that the escape of gases from the chamber is substantially retarded. This gives an opportunity for slag and other substances flowing downwards through the chamber to interact with residues being carried by the gases, as explained above, to the gas outlet. The position of the gas outlet in relation to the melting zone is thus also important in the context of the present invention. In the absence of a column of waste, or where the gas outlet is not upstream of the hot zone, the gases carrying the residues are substantially freely vented from the chamber, and cannot effectively interact with slag or other materials that are input to the processing chamber. Furthermore, the column of waste helps to maintain quasi steady state conditions within the processing plant, and a stable temperature profile is also maintained therein, comprising a relatively cooler upper zone, herein the gasification zone, where organic material is gasified, and a lower hotter zone, herein the melting zone, in which substantially all the inorganic materials are converted into molten metals and non-metallic inorganic slag, close to the plume generated by the plasma torches of the processing chamber. As inorganic waste in the downstream part of the column is melted, and as organic waste in the upper part is gasified, the waste in the column gradually migrates towards the downstream end, and more waste may be input into the chamber. This, however, does not substantially affect the quasi-steady state conditions referred to above. The conditions provided in the melting zone include sufficient temperature and residence time, such that the slag is sufficiently melted so that when it is removed from the chamber and subsequently cooled it forms solidified fused slag. However, the melting zone may also be adapted to be a vitrification zone, in which the conditions, i.e., temperature and/or residence time are increased sufficiently such that at least part of the slag is vitrified, and thus has a glassy, non-crystalline structure after solidification outside of the chamber.

CH 691507 relates to a method, and device, for burning solid or viscous material in grate firing unit. The method involves delivering material to a grate (2) and burning it. Hot gases are conducted through further units (9, 12, 15, 20), in which pollutants in the gases are at least partly separated out. The unburned material is conducted as slag to a slag remover (3). The pollutant residues are collected from the gases, which are preferably passed through a steam boiler (9) and a mixer (12) to remove pollutants, and the pollutants returned to the grate. This arrangement supposedly has advantages of high combustion efficiency with reduced residual waste and pollutant levels.

In the first place, this reference is concerned with the combustion of materials using a grate firing unit. This is very different from a high temperature (typically plasma-based) waste processing plant, in which the conditions include higher working temperatures and residence times such as to melt metals therein. Further, the pollutants of this reference are introduced between two portions of the grate, and it is unclear whether this is actually the high temperature zone provided by the combustion process therein. Furthermore, the grate arrangement, if used with plasma torches instead of a combustion system would result in molten slag being deposited onto the grate, which would thus become dogged and inoperative, and/or in the grate itself melting. In particular, the disclosed device of this reference is not adapted for accommodating a column of waste—rather, waste is fed onto the grate and burned thereon. Also, the gases are removed well downstream of the grate, and therefore cannot in any case interact with the waste or any other material that is being input to the chamber. Accordingly, the advantages of the present invention are not so readily achievable with the device and method of this reference. Finally, there is no disclosure at all of the pollutants being provided in the form of pellets via the waste inlet of the incinerator.

WO 89/09253 relates to a method and device for the incineration of refuse. Flyash produced by incineration in the plant (and optionally other sources) is introduced into the refuse being incinerated. In contrast to the present invention, though, the flyash is introduced at the cold upper part of the chute, at a location where the temperature is about 20° C., rather than in the hot kiln. Furthermore, the flyash is introduced as powder, or as a sludge, mixed with a liquid, and not in pellets of the type of the present invention. Hence, this reference neither discloses nor suggests the present invention. Moreover, the incinerator of the reference does not comprise a gas outlet upstream of the kiln, and if it were to be fitted with plasma torches and a gas outlet in the waste processing chamber, the flyash would continue to be ejected out therefrom via the gas outlet. In the reference, gas is passed from the downstream end of the kiln to an electrostatic filter via a baffle and boiler. This reference therefore does not disclose or suggest the present invention.

EP 324 454 relates to a method for cleaning the smoke gases from large combustion units, in which the largest part of the solid matter carried by the smoke gases (flue ash) is separated by dry dust filtering (9), the remaining solid matter is precipitated in a subsequent acid smoke gas scrubber (10) and wherein the solid matter in the dry dust filtering is melted down possibly together with waste and/or admixtures melting to glass and the solid matter elutriated in the smoke gas scrubbing is extracted and filtered. The method is directed to combustion units rather than to high temperature (plasma-torch) based processing plants. Further, there is no disclosure or suggestion of the combustion unit being adapted for accommodating a column of waste, or of the flyash being input into the high temperature zone of the combustion unit, or of forming the flyash into pellets for feeding into the top of the combustion unit together with waste, in contrast to the present invention. Even less so is there any suggestion of slag being recycled into the combustion unit.

U.S. 2002/006372 relates, inter alia, to a waste treatment equipment and method in which waste is passed from a low temperature horizontal type rotary drum furnace, to a high temperature combustion melting furnace, and water insoluble constituents k are returned to the low temperature furnace, while solid residues therefrom (not carried by gas) are fed into the high temperature melting furnace. Thus, this reference does not disclose a processing chamber as in the present invention—indeed the rotary furnace by definition cannot accommodate a column of waste—and the gas-borne residues are eventually input to the low temperature furnace, rather than the hotter melting furnace. There is also no disclosure or suggestion that the dust collected by dust collectors is to be directly input to the high temperature region of the melting furnace. Finally, there is no suggestion or disclosure of the residues being formed into pellets, or of these and/or slag being fed at the cooler end of the furnace in the manner of the present invention.

WO 99/23419 relates to an explosion-proof, closed reaction chamber for disposal of objects containing explosive material. The chamber has a vacuum aperture, through which after the reaction is completed gases and easily movable reaction products can be sucked away. The inner surface has a temperature-resistant lining with a protection against splinters. The feed device comprises a movable floor aperture. The floor is hydraulically driven. An ignition device comprising a gas flame activates desired rapid reactions. It can also comprise an electrical light arc. A shock and thrust absorber consists of a large metal body and a second absorber device for thrust loads is incorporated in the upper side of the chamber. The chamber itself is thus not adapted for accommodating a column of waste, nor are there any residues that are input into the chamber. Rather, gases are transferred from the chamber via the upper opening to a plasma chamber, and eventually, residues originating from the plasma chamber and from the reaction chamber are reintroduced to a sluice. Thus, in contrast to the present invention, the plasma chamber is not for processing waste, nor is it adapted for accommodating a column of waste, but rather only accepts gaseous products from the reaction chamber. Further, there is no suggestion of the residues being provided to the hot zone of the plasma chamber, but are instead provided to the sluice. There is absolutely no hint of the residues being formed into high temperature pellets, nor of these or the slag being reintroduced to the plasma chamber via the upper cooler end thereof, in contrast to the present invention.

FR 2691524 relates to the disposal of radioactive graphite without contaminating the environment, by pulverising, mixing with water and burning, then purifying combustion gases and recycling unburnt solids. Graphite pieces are crushed and powdered in two stages to less than 200 microns particle size, then mixed with water and emulsifying and wetting agents to form a suspension. This. suspension is pumped through a heater (E) to a two-stage burner and the resulting combustion gases are purified before release to the environment, by passing through cylone(s), gas-washing system and absolute filter. Solids recovered from stages and are recycled to mixer. Gases may be cooled in heat exchanger before the washing stage, to recover some combustion heat. Alternatively, the gases are cooled by finely sprayed water. In either case gases are reheated to 80° C. before the final filtration. Thus, this reference merely relates to residues being reintroduced into the burners together with the "waste", in other words, there is no teaching at all of introducing the residues directly at the hot zone of the burners, or in the form of high temperature pellets with the waste.

DE 4333510 relates to a process for removing dust and toxic substances from hot gases. The process comprises introducing gases into a gas cooler, removing dust by a hot gas filter and passing through boiler and gas washer before release to the atmosphere. Hot dust-laden toxic gases arise from the combustion of liquid paste and solid residues in a rotating furnace and an afterburner chamber, and are then discharged to an assembly where they are treated. The hot gases are first introduced at 1200° C. into a gas cooler, where they cool to 800° C. before the dust is removed by a hot gas filter. The hot dust-free gases are then passed through a boiler where they surrender heat and generate steam. The hot gases are then passed through a gas washer before release to the atmosphere. The process removes substances from the gases which otherwise have a severe detrimental effect upon the system components through which they pass. Thus, this reference merely relates to dust residues being reintroduced into the rotating furnace together with the original waste, in other words, there is no teaching at all of introducing the residues at the hot zone of the furnace.

SUMMARY OF INVENTION

The present invention relates to a residues recycling system for recycling at least part of the residues formed in a waste processing plant, said waste processing plant having:—
- at least one waste processing chamber adapted for accommodating a column of waste and for enabling said waste to migrate through the chamber in a downstream direction, said chamber having at least one upstream gas outlet means and further having high temperature generating means adapted for providing a high temperature melting zone in a downstream part of said chamber and a relatively cooler upstream gasification zone, wherein said melting zone is at conditions at least sufficient for enabling substantially all inorganic waste therein to be melted into at least one of melted metals and slag, and wherein said upstream gasification zone is at conditions sufficient for enabling gasification of organic waste in said column of waste;
- at least one post processing means operatively connected to said at least one waste processing chamber, wherein said post-processing means are adapted for enabling said residues to be collected therefrom during operation of said at least one waste processing chamber;
- wherein said residues recycling system is characterized in being adapted for collecting said at least part of the residues from said post processing means and for introducing at least a portion of said at least part of the residues into said processing chamber such that during operation of said system said portion of said at least part of the residues is exposed to said high temperature melting zone provided by the said high temperature generating means.

The recycling system preferably comprises at least one collection reservoir operatively connected to said post processing means and adapted for collecting at least part of the residues therefrom.

The residues typically comprise at least two types of residues, including residues 1 and residues 2 which differ one from the other in at least their chemical properties, that are separately collectible from said post processing means, and said system comprises at least one said collection reservoir for separately collecting one or another of said residues 1 and residues 2.

In a first and third embodiments, the recycling system typically comprises suitable conduit means for providing communication between said at least one collection reservoir and said lower part of said at least one processing chamber, said conduit means adapted for transporting said residues from said at least one collection reservoir to said lower part of said at least one processing chamber for direct exposure of said residues to said hot zone during operation of said system. The system may further comprise suitable transport means operatively connected to said at least one collection reservoir for assisting transportation of said residues through said conduit means. The transport means may comprise a suitable fluid medium for transporting the said residues.

The system may further comprise suitable mechanical transport means operatively connected to said at least one collection reservoir for assisting transportation of said residues through said conduit means, and the transport means may comprise a suitable pump for transporting the said residues. The conduit means may comprise at least one suitable outlet operatively connected to said lower part of said processing chamber. The conduit means may comprise at least one suitable valve operable to enable the flow of at least a portion of said residues through said conduit means to be selectively prevented or allowed. The valve may be operatively connected to a suitable control system. The control system may be further operatively connected to at least one suitable sensor comprised in said post processing means and adapted for controlling the operation of said valve according to predetermined conditions sensed by said sensor.

In a second and third embodiments, the residues recycling system comprises a source of suitable additives and a suitable mixer for mixing at least a portion of said residues with said additives, said additives adapted for at least partially encapsulating said portion of residues in a matrix that is thermally and mechanically stable at temperatures substantially lower that the temperature of said melting zone, first granulating means for granulating said matrix into residue granules, and means for transporting said residue granules to a suitable inlet comprised in the cooler part of said at least one processing chamber. The additives may be chosen from any one or combination of cement, sodium silicate, organic compounds including thermoplastics, and inorganic compounds and/or complexes including oxide powders, oxide solutions, salt powders and salt solutions. The said inlet is typically a waste inlet for enabling waste to be input into said at least one processing chamber. The additives may comprise at least part of said slag, and the system may further comprise means for introducing at least part of said slag into said mixer. The system may also further comprise suitable transport means for transporting slag produced by said at least one processing chamber to said mixer. The system may further comprise suitable transport means operatively connected to said at least one collection reservoir for assisting transportation of said residues Optionally, the transport means comprises a suitable fluid medium for transporting the said residues at least to said mixer.

The recycling may further comprise suitable mechanical transport means operatively connected to said at least one collection reservoir for assisting transportation of said residues at least to said mixer. Optionally, the transport means comprises a suitable pump for transporting the said residues.

The recycling system may further comprise at least one suitable valve operable to enable the flow of at least a portion of said residues to said mixer to be selectively prevented or allowed Preferably, the valve is operatively connected to a suitable control system. Advantageously, the control system is further operatively connected to at least one suitable sensor comprised in said post processing means and adapted for controlling the operation of said valve according to predetermined conditions sensed by said sensor.

The volume (Vg) and external surface area (Fg) of at least a portion of said residue granules may be chosen such that:

$$Vg/Fg \geq 0.00002 * H$$

wherein H is a predetermined linear distance that is correlated to the travel distance of the residue granules from the upper part of the processing chamber to the lower part thereof.

H may comprise the height of the said processing chamber taken from the center of the said gas outlet to the centre of the slag outlet port comprised in said lower part and adapted for enabling the molten slag to exit the said processing chamber. Alternatively, H comprises the vertical distance taken from the center of the said gas outlet to a nominal level of the surface of the molten slag at the said lower part of the said chamber. Alternatively, H comprises the vertical distance taken from the center of the said gas outlet to said high temperature zone of said lower part of said processing chamber. Alternatively, the processing chamber comprises at least one plasma torch means and H comprises the vertical distance taken from the center of the said gas outlet to the center of the output end of said at least one plasma torches means.

At least a portion of said slag may be removed from said chamber and subsequently cooled to provide solidified fused slag. Preferably, said conditions in said melting zone provided by said high temperature generating means are sufficient such that said melting zone is also a vitrification zone, and at least a portion of said slag may be removed from said chamber and subsequently cooled to provide solidified vitrified slag.

The residues recycling system according to all embodiments optionally further comprises a slag recycling system for at least part of the slag formed in a waste processing plant and subsequently cooled and solidified after extraction therefrom, wherein said slag recycling system comprises a suitable converting means for converting at least part of said solidified slag into slag particles, and means for transporting at least a part of said slag particles to a suitable inlet comprised in the cooler part of said at least one processing chamber. Preferably, the said inlet is a waste inlet for enabling waste to be input into said at least one processing chamber. Preferably, the system further comprises means for introducing suitable additives into said converting means.

The volume (Vr) and surface area (Fr) of at least a portion of said slag particles may be chosen such that:

$$Vr/Fr < Vg/Fg$$

wherein (Vg) is the volume and (Fg) is the external surface area of the residue granules provided by said recycling system.

In one application of the present invention, the high temperature generating means comprises at least one plasma torch means comprising an output end extending into a lower part of said waste processing chamber said at least one plasma torch means adapted for providing a high temperature melting zone in a lower part of said chamber at least sufficient for enabling substantially all inorganic waste accommodated therein to be melted.

The present invention also relates to a waste processing plant comprising:—
- at least one waste processing chamber adapted for accommodating a column of waste and for enabling said waste to migrate through the chamber in a downstream direction, said chamber having at least one upstream gas outlet means and further having high temperature generating means adapted for providing a high temperature melting zone in a downstream part of said chamber and a relatively cooler upstream gasification zone, wherein said melting zone is at conditions at least sufficient for enabling substantially all inorganic waste therein to be melted into at least one of melted metals and slag, and wherein said upstream gasification zone is at conditions sufficient for enabling gasification of organic waste in said column of waste;
- at least one post processing means operatively connected to said at least one waste processing chamber, wherein said post-processing means are adapted for enabling said residues to be collected therefrom during operation of said at least one waste processing chamber, and characterized in further comprising a residues recycling system as herein defined.

The post-processing means may comprise a suitable afterburner, a suitable energy utilization means, a suitable gas cleaning system and a suitable stack operatively connected in series to said processing chamber.

Alternatively, the post-processing means comprises a suitable afterburner, a combustion products cooling system, a suitable gas cleaning system and a suitable stack operatively connected in series to said processing chamber.

Alternatively, the post-processing means comprises a suitable gas cleaning system, a suitable energy utilization means and a suitable stack operatively connected in series to said processing chamber, and further comprises a waste water treatment system operatively connected to said gas cleaning system.

Alternatively, the post-processing means comprises a suitable gas cleaning system and a waste water treatment system operatively connected to said gas cleaning system, and wherein said gas cleaning system is adapted for channeling clean fuel gases therefrom to an external user.

In one application of the present invention, the waste processing plant is a plasma torch based plant, and the high temperature generating means comprises at least one plasma torch means comprising an output end extending into a lower part of said waste processing chamber said at least one plasma torch means adapted for providing a high temperature melting zone in a lower part of said chamber at least sufficient for enabling substantially all inorganic waste accommodated therein to be converted into at least one of molten metal and slag.

The present invention also relates to a method for recycling at least a part of residues formed in a waste processing plant, said waste processing plant having:—
- at least one waste processing chamber adapted for accommodating a column of waste and for enabling said waste to migrate through the chamber in a downstream direction, said chamber having at least one upstream gas outlet means and further having high temperature generating means adapted for providing a high temperature melting zone in a downstream part of said chamber and a relatively cooler upstream gasification zone, wherein said melting zone is at conditions at least sufficient for enabling substantially all inorganic waste therein to be melted into at least one of melted metals and slag, and wherein said upstream gasification zone is at conditions sufficient for enabling gasification of organic waste in said column of waste;
- at least one post processing means operatively connected to said waste processing chamber, wherein said post-processing means are adapted for enabling said residues to be collected therefrom during operation of said at least one waste processing chamber;

wherein said method comprises the steps:
- collecting at least part of said residues from a said post processing means; and
- introducing at least part of said residues into a said processing chamber such that during operation of said system said residues are exposed to said high temperature melting zone provided by the said high temperature generating means.

Optionally, in step (a), said residues are collected in at least one suitable collection reservoir operatively connected to said post processing means.

Typically, the residues comprise at least two types of residues, including residues 1 and residues 2 which differ one from the other by at least their chemical properties, that are separately collectible from said post processing means, and wherein in step (a) residues 1 and residues 2 are separately collected in different said collection reservoirs.

Optionally, in step (b), said residues are transported from said at least one collection reservoir to said lower part of said at least one processing chamber for direct exposure of said residues to said hot zone during operation of said system.

Optionally, in step (b), suitable additives are mixed with at least a portion of said residues, said additives being adapted for at least partially encapsulating said portion of residues in a matrix that is thermally and mechanically stable at temperatures substantially lower that the temperature of said hot zone, said matrix is granulated into suitable residue granules, and said residue granules are transported to a suitable inlet comprised in the cooler part of said at least one processing chamber for introduction into the said at least one processing chamber. Advantageously, the volume (Vg) and external surface area (Fg) of at least a portion of said residue granules are chosen such that:

$$Vg/Fg \geq 0.00002*H$$

wherein H is predetermined linear distance that is correlated to the travel distance of the residue granules from the upper part of the processing chamber to the lower part thereof.

Preferably, H comprises the height of the said processing chamber taken from the center of the said gas outlet to the centre of the slag outlet port comprised in said lower part and adapted for enabling the molten slag to exit the said processing chamber.

Alternatively, H comprises the vertical distance taken from the center of the said gas outlet to a nominal level of the surface of the molten slag at the said lower part of the said chamber.

Alternatively, H comprises the vertical distance taken from the center of the said gas outlet to said high temperature zone of said lower part of said processing chamber.

Alternatively, the processing chamber comprises at least one plasma torch means and H comprises the vertical distance taken from the center of the said gas outlet to the center of the output end of said at least one plasma torches means.

Optionally, the method further comprises the step (c) of introducing slag granules to a suitable inlet comprised in the cooler part of said at least one processing chamber for introduction into the said at least one processing chamber, said slag granules being produced by granulating at least a portion of the slag provided by the said processing chamber during operation thereof. Preferably, the volume (Vr) and surface area (Fr) of at least a portion of said slag granules are chosen such that:

$$Vr/Fr < Vg/Fg$$

wherein (Vg) is the volume and (Fg) is the external surface area of the residue granules provided in step (b).

In said method, components of said residues may be introduced into slag, particularly the recycled slag, which is subsequently removed from said apparatus and subsequently cooled and solidified to trap therein said components. These components may include any one or more of Cd, Zn, Pb, Cu, Tl, Hg, Sb, As, Cr, Mn, Ni, V, Cl, S, P, F, in elemental form or in compounds. The conditions in said hot melting zone are preferably such that the said slag is vitrified thereat.

In the method, components of said residues may form solid solutions with said slag, which is subsequently removed from said apparatus and subsequently cooled and solidified to form vitrified slag. These components may include one or more of Hg, S, Cl, As, Se and oxides of metals: Cr, Ni, Mn, Co, Mo (3-5%); Ti, Cu, F, La, Ce, Cd, Th, Bi, Zr (5-15%); Li, B, Na, Mg, K, Ca, Fe, Zn, Rb, Cs, Sr, Ba, U; Al, Si, P, Pb.

DISCLOSURE OF INVENTION

Figure 1:
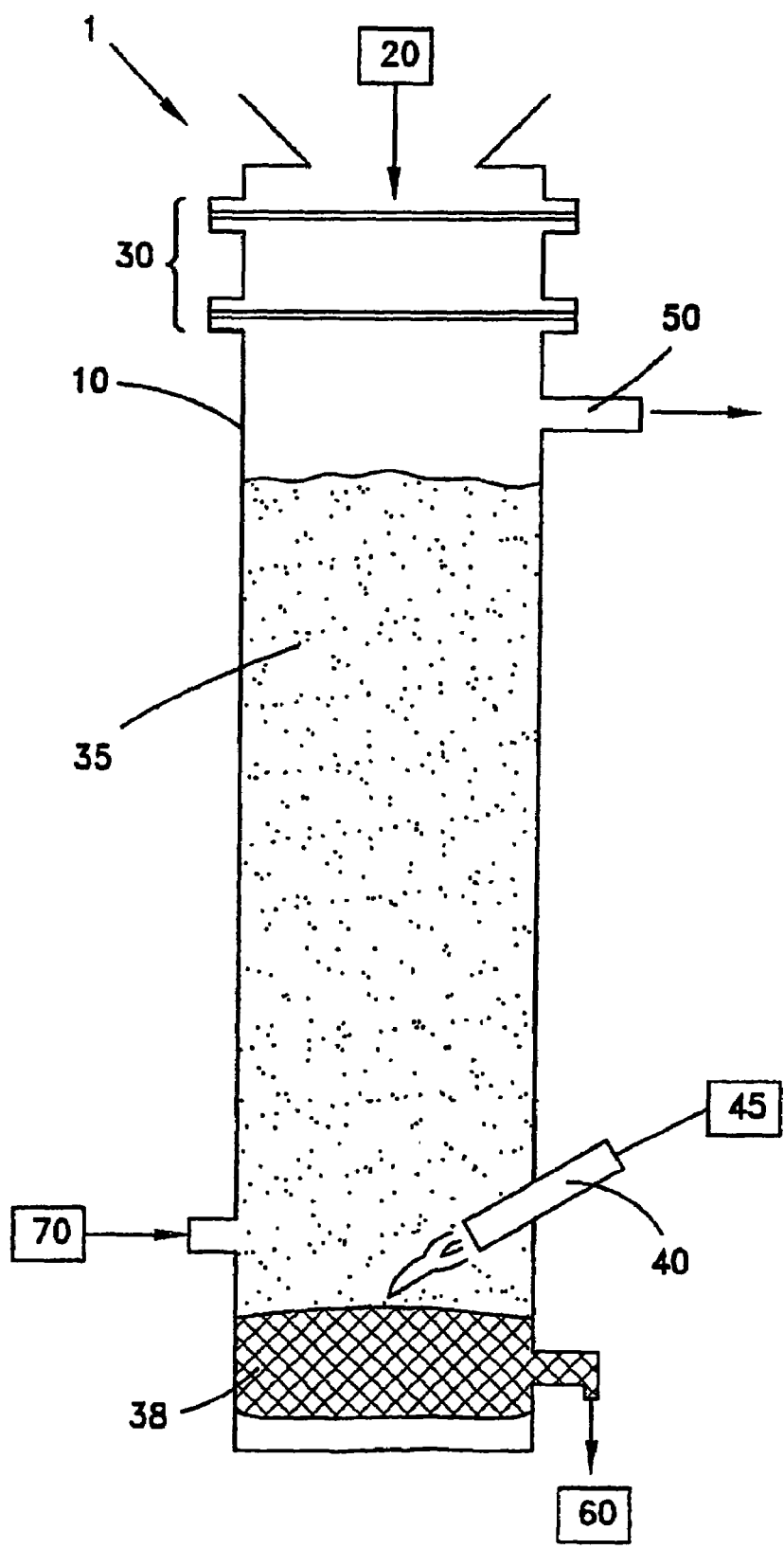
FIG. 1 shows schematically the general layout and main elements of a typical waste plasma processing apparatus of the prior art.

The present invention is defined by the claims, the contents of which are to be read as included within the disclosure of the specification, and will now be described by way of example with reference to the accompanying Figures.

The present invention relates to a system for recycling non-gaseous residues, generated by a waste processing apparatus, in order to reduce the eventual volume of residues and to dispose of at least a part of the heavy metals, produced by the waste converting apparatus, by encasing the compounds and complexes of metals in the slag melt, i.e., while the slag is still molten. The recycling system is characterized in that the residues are redirected to the apparatus in such a manner as to reach the hotter parts of the processing chamber of a waste converting apparatus for processing thereof at the higher temperature zones of the apparatus, that is, the melting zone, without being substantially affected by the lower temperature gasification zones thereof. The present invention is also directed to such waste converting apparatus having the aforesaid system, and to methods of operating such systems and apparatuses.

The term "downstream" refers to a direction along the direction of flow of waste in the processing chamber from the waste inlet to the melting zone, while "upstream" refers to a direction substantially opposed thereto. With reference to other parts of the apparatus, the term "downstream" refers to a direction along the direction of flow of material in the part of the apparatus, while "upstream" refers to a direction substantially opposed thereto.

The term "waste converting apparatus" herein includes any apparatus adapted for treating, processing or disposing of any waste materials, including municipal waste (MSW), household waste, industrial waste, medical waste, sewage sludge waste (SSW), radioactive waste and other types of waste, in particular by means of plasma treatment.

The term "slag" herein refers primarily to the inorganic, non-metallic material that collects at the bottom end of the waste processing apparatus in a substantially molten state after it has been treated by the heat generating means, particularly in the form of plasma torches. Nevertheless, the term "slag" herein may also include a mixture of such slag and metals, and also a suspension of metal particles in such slag. The term "fused slag" relates herein to slag that was formed in such an apparatus, and subsequently solidified after cooling.

The term "vitrification" relates to the formation of slag in a glassy or non-crystalline form, wherein the temperature and/or residence time is sufficient such that the inorganic waste is fully melted.

The term "residues" herein refers to non-gaseous materials that are precipitated or otherwise extracted downstream (that is along the direction of flow of gases away from the processing chamber) of the gas outlet of the processing chamber, particularly in the post-processing means operatively connected thereto. Such residues are herein subcategorized as Residues 1 (R1) and Residues 2 (R2). Residues 1 (R1) are herein defined as the residues that originate from the waste processing chamber of the apparatus and are entrained therefrom by gases, and/or residues that originate as a result of the subsequent combustion process in the post-processing means. In other words, Residues 1 (R1) are formed when the materials exiting the processing chamber via the gas outlet are treated in the post-processing means only with air (and/or oxygen) and/or by water, but without any additives. Residues 2 (R2) are characterized in also comprising materials which originate from the input of additional substances into the post-processing means (such as for example additional reagents and products of their reactions), in particular the gas cleaning systems, but may possibly also include Residues 1 (R1) mixed therein In other words, if additives or special reagents are used in part of the post-processing means, then Residues 2 (R2) are formed in this part of the post-processing means, and/or downstream thereof.

The term "post processing means" refers to any apparatus or system operatively connected to the waste processing chamber of the apparatus, in particular the gas outlet thereof, and adapted for the further processing of product gases generated by the waste processing chamber.

Figure 4:
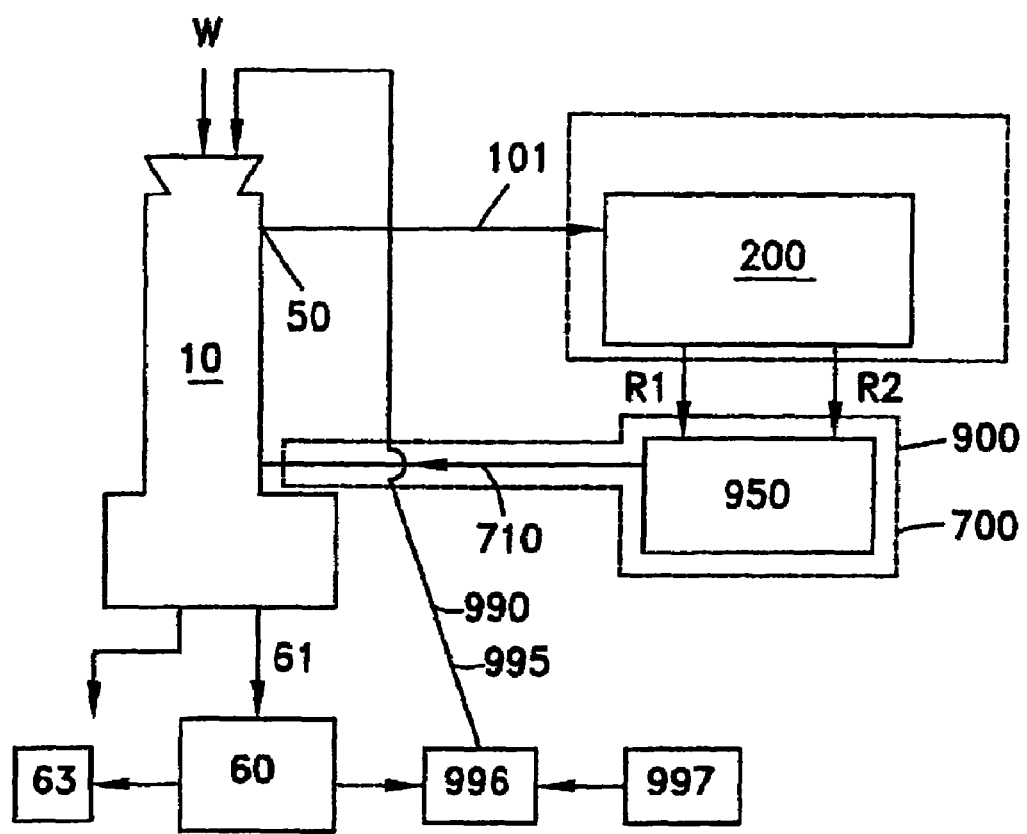
FIG. 4 shows schematically the general relationship between the main elements of a first embodiment of the present invention.
Figure 5:
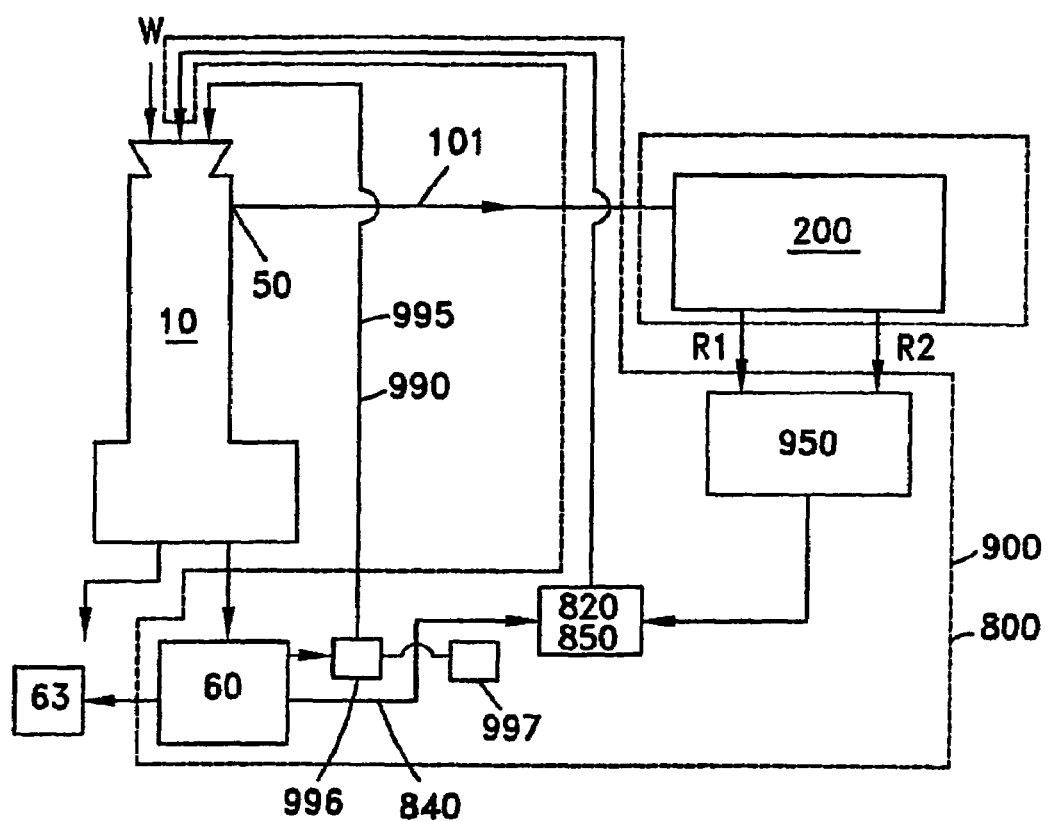
FIG. 5 shows schematically the general relationship between the main elements of a second embodiment of the present invention.
Figure 6:
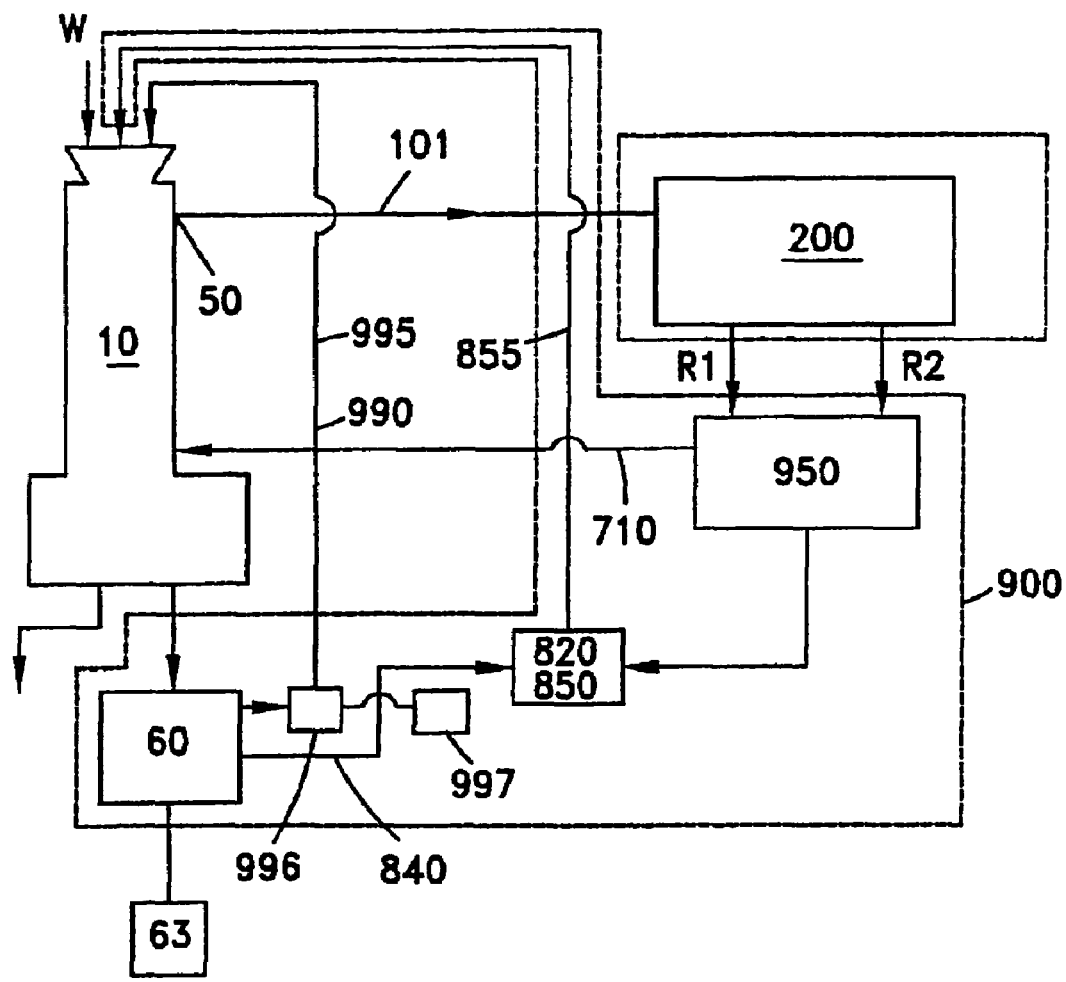
FIG. 6 shows schematically the general relationship between the main elements of a third embodiment of the present invention.

Referring to the Figures, FIGS. 4, 5, and 6 illustrate schematically a first, second, and third embodiments of the present invention. A post processing means (200) is operatively connected to at least one waste converting apparatus (10) via a gas outlet line (101) at the gas outlet (50) of the apparatus (10), and in fact one (or more) post-processing means may be operatively interconnected to one or a plurality of said apparatus (10) in any desired permutation or combination, in a manner similar to that described herein with respect to the operative connection between single post-processing means and a single processing chamber, mutatis mutandis. The post-processing means (200) may be any type of post processing means that may be connected to the apparatus to post-process the product gases, and that generates therein Residues 1 (R1) and/or Residues 2 (R2), and thus may include any one of the post-processing means (2) illustrated in FIGS. 2(a), 2(b), 3(a) and 3(b), for example.

Referring to FIG. 4, in the first embodiment of the present invention, the residues recycling system (900) according to the invention is in the form of a direct feed system (700), configured to directly channel the residues precipitated in the gas processing means (200) to the chamber (10).

Referring to FIG. 5, in the second embodiment of the present invention, the residues recycling system (900) is in the form of a indirect feed system (800), configured to encapsulate the residues in a thermally and mechanically protecting matrix of slag and other additives, and to then channel the encapsulated residues to the chamber (10).

Referring to FIG. 6, in the third embodiment of the present invention the residues recycling system (900) comprises both the direct feed system (700) and the indirect feed system (800), substantially as for the first and second embodiments, respectively, mutatis mutandis.

Figure 2A:
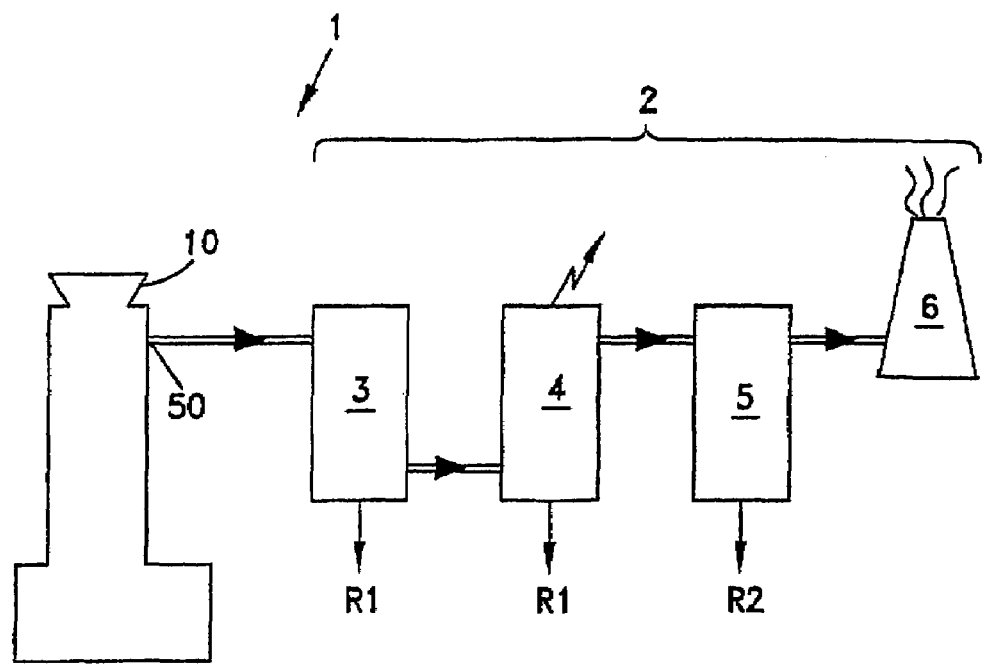
FIGS. 2(a), and 2(b) illustrate schematically the general layout and main elements of two derivatives of one type of a typical waste processing plant of the prior art, including the apparatus of FIG. 1 and post-processing elements.
Figure 2B:
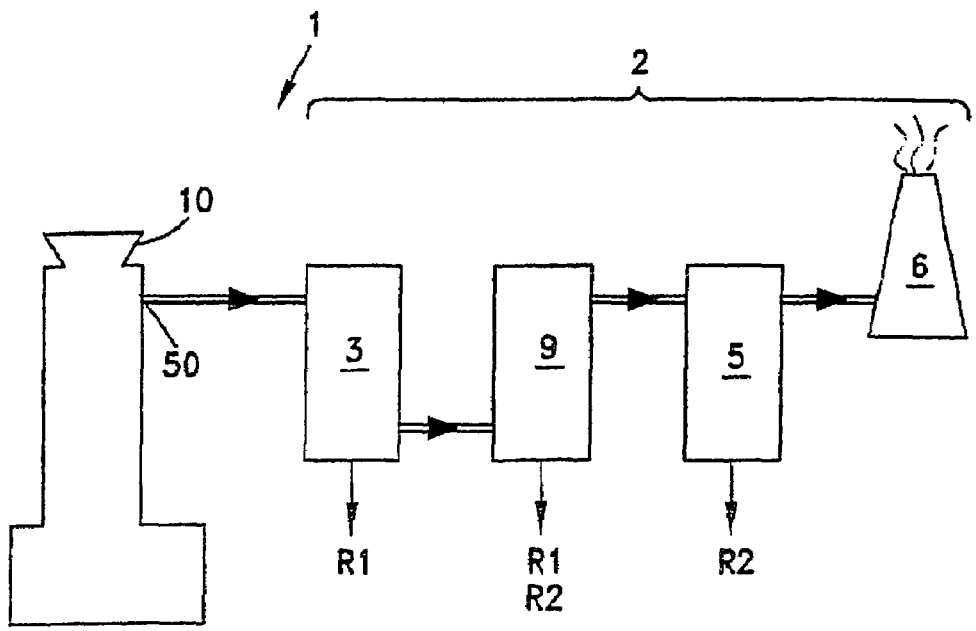
Figure 3A:
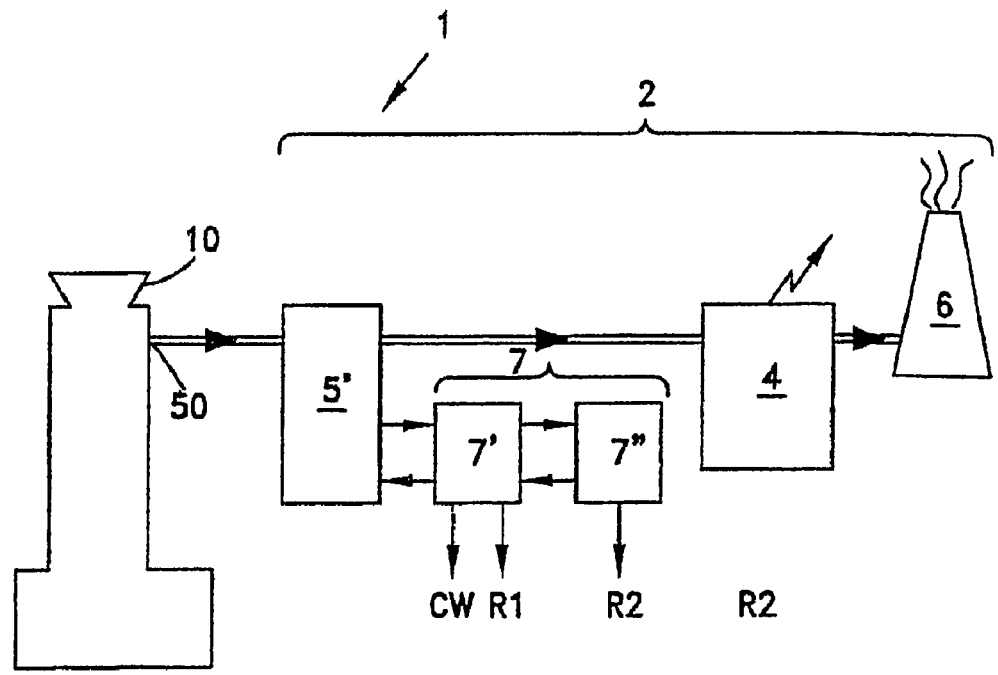
FIGS. 3(a) and 3(b) illustrate schematically the general layout and main elements of two derivatives of another type of a typical waste processing plant of the prior art, including the apparatus of FIG. 1 and post-processing elements.
Figure 3B:
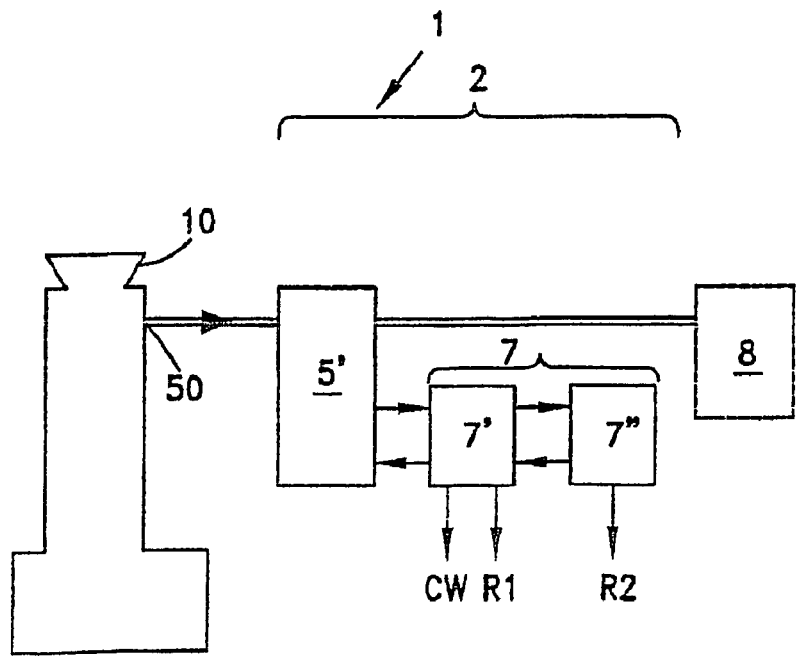

Hereinafter, the first, second and third embodiments of the present invention are described in greater detail in the context of the type of post-processing means illustrated schematically in FIG. 2(a). Clearly, though, the residue recycling system (900) according to any of these embodiments is similarly applicable to any other type of post-processing means (200) that is operatively connected to the outlet (50) and produces non-gaseous residues, including for example the post-processing means illustrated in FIGS. 2(b), 3(a), 3(c), mutatis mutandis.

Figure 7:
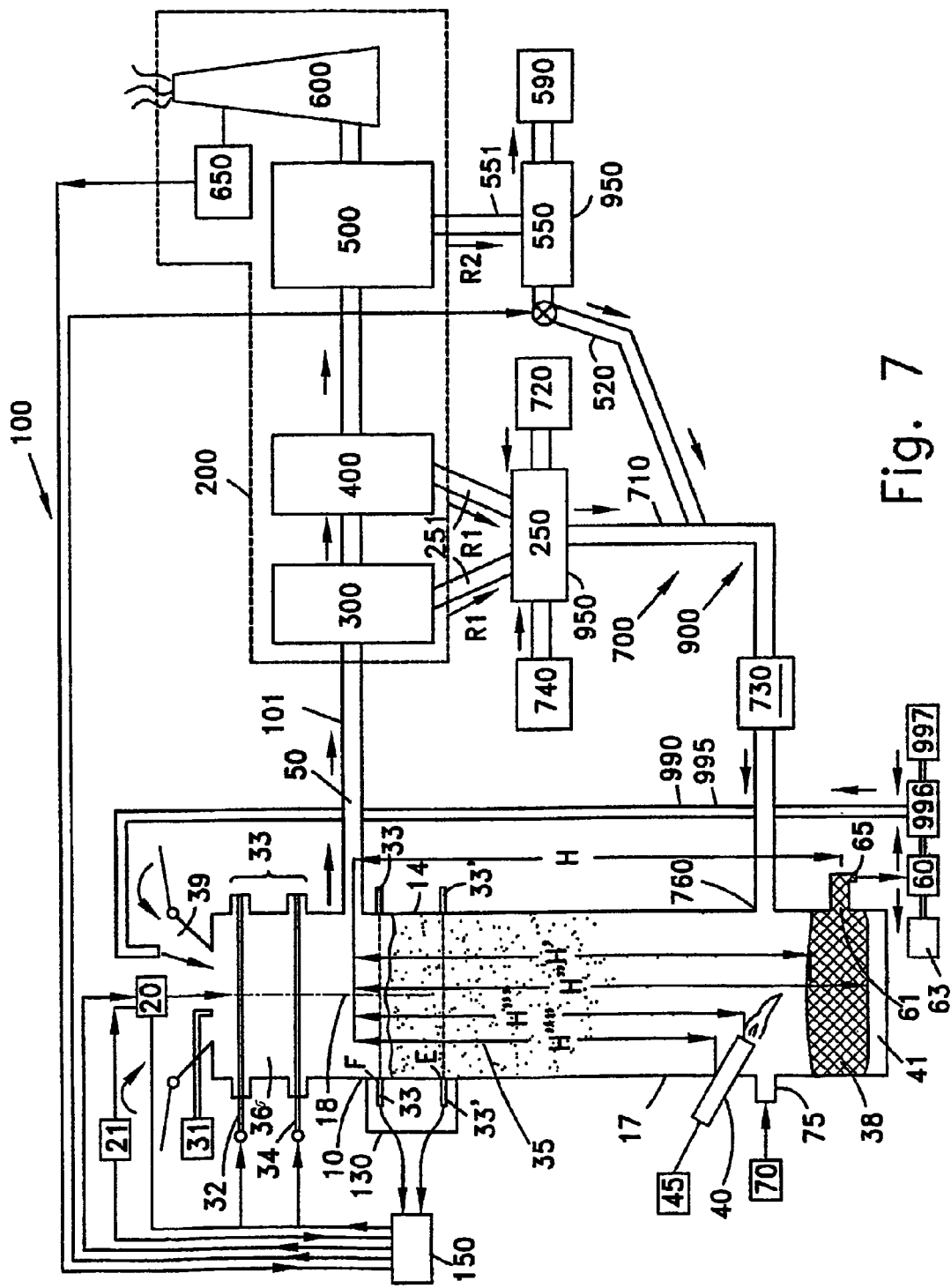
FIG. 7 shows schematically the general layout and main elements of a first embodiment of the present invention.
Figure 8:
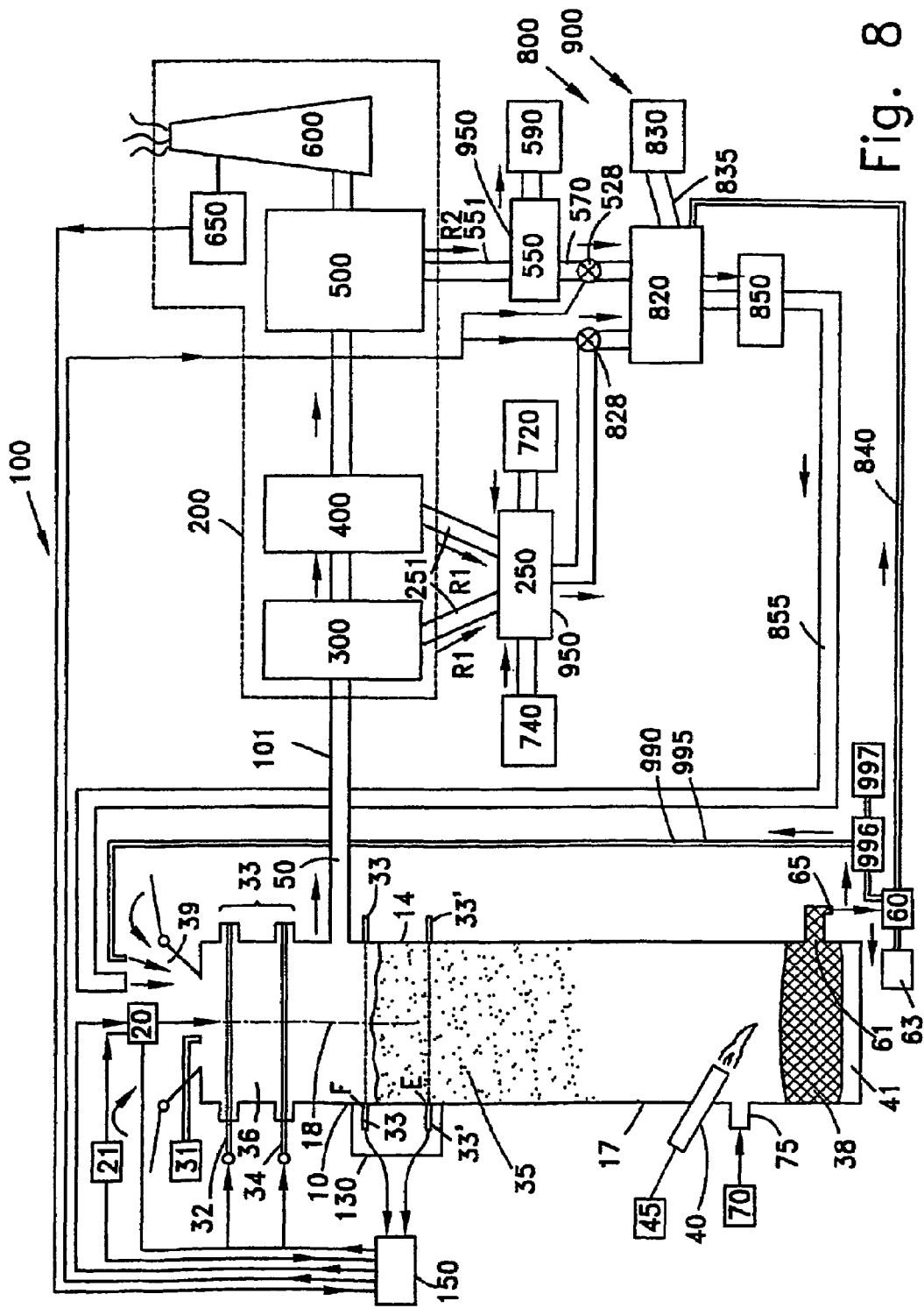
FIG. 8 shows schematically the general layout and main elements of a second embodiment of the present invention.
Figure 9:
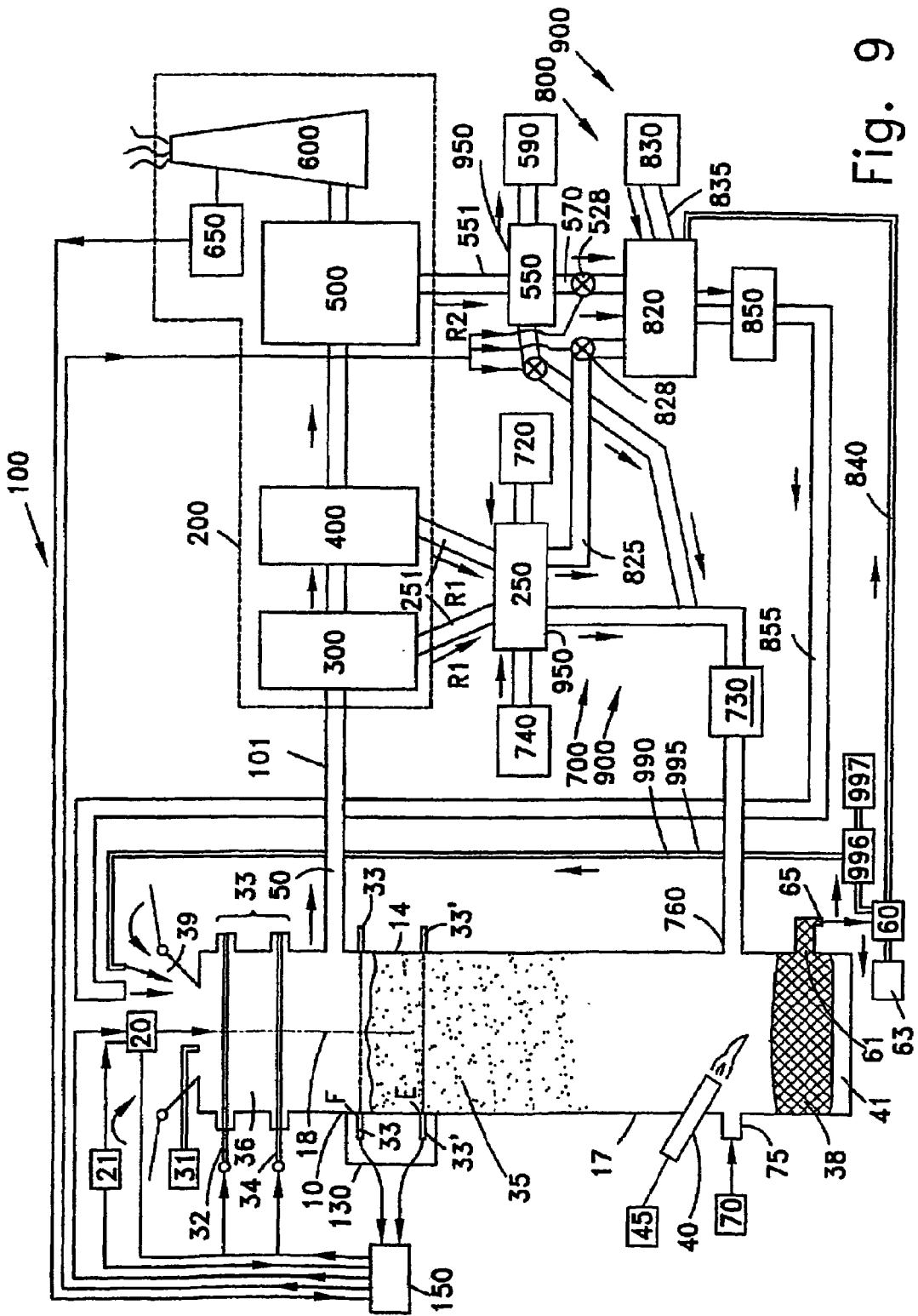
FIG. 9 shows schematically the general layout and main elements of a third embodiment of the present invention.

Thus, and referring to FIGS. 7, 8 and 9, in each of the corresponding first, second and third embodiments, respectively, the plasma waste processing converting apparatus or plant, designated by the numeral (100), comprises a processing chamber (10), the upstream upper portion (14) of which, while typically is in the form of a cylindrical or frusta-conical vertical shaft, may be in any desired shape.

It is important to note that in the present invention, the waste processing chamber (10) is adapted to accommodate a column of waste. The column of waste between the hot zone (that is provided by the plasma torches) and the upstream gas outlet provides a tortuous matrix structure for gases that are formed in the gasification process, so that the escape of gases from the chamber is substantially retarded. This gives an opportunity for slag and/or other substances flowing downwards through the chamber according to the invention to interact with residues being carried by the gases towards the gas outlet, as explained above. The upstream position of the gas outlet in relation to the melting zone is thus also important in the context of the present invention. In the absence of a column of waste, or where the gas outlet is not upstream of the hot zone, the gases carrying the residues are substantially freely vented from the chamber, and cannot effectively interact with slag or other materials that are input to the processing chamber. Furthermore, the column of waste helps to maintain quasi steady state conditions within the processing plant, and a stable temperature profile is also maintained therein, comprising a relatively cooler upper zone, herein the gasification zone, and a lower hotter zone, herein the melting zone, close to the plume generated by the plasma torches of the processing chamber. In the upper gasification zone, organic material is gasified. In the lower melting zone inorganic materials are converted into molten metals and molten slag, which may be removed separately or together. When the residence time of the inorganic material in the melting zone is sufficiently large, at least part of the slag (including oxides and other chemical elements) will be vitrified. On the other hand, when the residence time is not sufficiently long to produce vitrification, the molten slag, when cooled, will form solidified fused slag. In the present invention, the melting zone provides conditions such that all of the inorganic material may eventually be melted, given sufficient residence time, and typically also that at least a part of the inorganic material will be converted into fused slag, when non-metallic inorganic materials are included in the waste. Preferably, all of the inorganic material is converted into vitrified slag, and thus the melting zone may also be referred to as the vitrification zone.

As inorganic waste in the downstream part of the column is melted, and as organic waste in the upper part is gasified, the waste in the column gradually migrates towards the downstream end, and more waste may be input into the chamber. This, however, does not substantially affect the quasi-steady state conditions in the chamber referred to above.

While the high temperature zone is preferably provided by at least one plasma torch means, as will be described in greater detail herein, other means may also be used for providing this high temperature zone, so long as conditions are provided in the melting zone such as to melt substantially all of the inorganic material comprised in the waste accommodated therein. For example, preheated oxidizing gas such as air or oxygen, mixed with suitable fuel such as coke, for example, may be used to provide the melting zone. The temperature in the melting zone may be further augmented in either case using an oxidizing fluid, with fuel, or air by itself that may be preheated to high temperatures, such as 1000° C. or more using a regenerative heat exchanger associated with the post-processing means (200), described herein.

Typically, a solid or mixed waste feeding system (20) introduces typically solid waste at the upper end of the chamber (10) via a waste inlet means comprising an air lock arrangement (30). Mixed waste may also be fed into the chamber (10), though generally gaseous and liquid waste is removed from the apparatus (10) without substantial treatment. The solid/mixed waste feeding system (20) may comprise any suitable conveyor means or the like, and may further comprise a shredder for breaking up the waste into smaller pieces. The air lock arrangement (30) may comprise an upper valve (32) and a lower valve (34) defining a loading chamber (36) therebetween. The valves (32), (34) are preferably gate valves operated electrically, pneumatically or hydraulically to open and close independently as required. A closeable hop arrangement (39) funnels typically solid and/or mixed waste from the feeding system (20) into the loading chamber (36) when the upper valve (32) is open, and the lower valve (34) is in the closed position. Feeding of waste into the loading chamber (36) typically continues until the level of waste in the loading chamber (36) reaches a predetermined point below full capacity, to minimise the possibility of any waste interfering with closure of the upper valve (32). The upper valve (32) is then closed. In the closed position, each of the valves (32), (34) provides an air seal. When required, the lower valve (34) is then opened enabling the waste to be fed into the processing chamber (10) with relatively little or no air being drawn therewith. The opening and closing of the valves (32), (34), and the feeding of waste from the feeder (20) may be controlled by any suitable controller (150), which may comprise a human controller and/or a suitable computer control system, operatively connected thereto and to other components of the plant (100). Preferably, a waste flow sensing system (130) is provided and operatively connected to the controller (150). The sensing system (130) typically comprises one or more suitable sensors (33) at an upper part or level (F) of the chamber (10) for sensing when the level of waste reaches this level. Similarly, the sensing system (130) typically also comprises one or more suitable sensors (33') at a level (E), vertically displaced downwards with respect to level (F) of the chamber (10), for sensing when the level of waste reaches this level. Level (F) may advantageously represent the maximum safety limit for waste in the chamber (10), while level (E) may represent a level of waste within the chamber (10) at which it is efficient to provide more waste to the chamber (10). Thus, the volume in the chamber (10) between level (E) and level (F) may be approximately equal to the volume of waste that may be accommodated in loading chamber (36). Alternatively, or additionally, the location of the sensors (33) and (33') at levels (F) and (E) may be chosen to provide suitable datums for determining an actual flow rate of the waste through the chamber (10) by measuring the time interval between the time when the level of waste is at level (F) to when it reaches level (E), for example. The controller (150) may also be operatively connected to valves (32), (34) to coordinate loading of the loading chamber (36) from the feeding system (20), and unloading of the waste from the loading chamber (36) to the processing chamber (10).

Optionally, the hop arrangement (39) may comprise a disinfectant spraying system (31) for periodically or continuously spraying the same with disinfectant, as required, particularly when medical waste is being processed by plant (100).

The processing chamber (10) comprises a lower part (17), herein defined as comprising the hot melting zone of the chamber, wherein pyrolysis and vitrification of inorganic material into molten and preferably vitrified inorganic slag and into molten metal takes place. The lower part (17) comprises a liquid product collection zone (41), typically in the form of a crucible, having at least one outlet (65) associated with one or more collection reservoirs (60). The processing chamber (10) further comprises at the upper end thereof at least one gas outlet (50), primarily for channeling product gases, generated from the processing of waste, away from the processing chamber (10). The upper end of the processing chamber (10) comprises the said air lock arrangement (30), and the processing chamber (10) is typically filled with waste material via the airlock arrangement (30) up to about the level of the primary gas outlet (50). Sensing system (130) senses when the level of waste drops sufficiently (as a result of processing in the chamber (10)) and advises controller (150) to enable another batch of waste to be fed to the processing chamber (10) via the loading chamber (36). The controller (150) then closes lower valve (34) and opens upper valve (32) to enable the loading chamber (36) to be re-loaded via feeding system (20), and then closes upper valve (32), ready for the next cycle.

One or a plurality of plasma torches (40) at the lower part (17) of the processing chamber (10) are operatively connected to suitable electric power, gas and water coolant sources (45), and the plasma torches (40) may be of the transfer or non-transfer types. The torches (40) are mounted in the chamber (10) by means of suitably sealed sleeves, which facilitates replacing or servicing of the torches (40). The torches (40) generate hot gases that are directed downwardly typically at an angle into the bottom end of the column of waste. The torches (40) are distributed at the bottom end of the chamber (10) such that in operation, the plumes from the torches (40) heat the bottom of the column of waste, as homogeneously as possible, to a high temperature, typically in the order of about 1600° C. or more. The torches (40) generate at their downstream output ends hot gas jets, or plasma plumes, having an average temperature of about 2000° C. to about 7000° C. The heat emanating from the torches (40) ascends through the column of waste, and thus a temperature gradient is set up in the processing chamber (10). Hot gases generated by the plasma torches (40) support the temperature level in the chamber (10). This temperature level is sufficient at least at the lower part of the chamber (10) for continuously converting the waste into product gases that are channeled off via outlet (50), and into a liquid material (38) that may include molten metal and/or slag, which may be periodically or continuously collected at the lower end of the chamber (10) via one or more slag outlets (61) and into one or more reservoirs (60). Typically, the molten metal and the slag are collected separately in dedicated reservoirs. Hereinafter, unless otherwise specified, the reference numeral (60) indicates the slag reservoir.

Oxidising fluid may be provided from a suitable source (70) to convert char, produced during pyrolysis of organic waste, into useful gases such as CO and $H_2$, for example. The oxidising fluid is introduced to the lower part of the chamber (10) via one or more suitable inlet ports (75). "Oxidising fluid" is herein taken to include any gas or other fluid capable of oxidising at least in part char found or produced in the hotter, lower parts of the processing chamber of the waste processing apparatus, and includes oxygen, steam, air, $CO_2$ and any suitable mixture thereof.

The inner facing surfaces of processing chamber (10), at least of the lower part thereof, are typically made from one or more suitable refractory materials, such as for example alumina, alumina-silica, magnesite, chrome-magnesite, chamotte or firebrick. Typically, the processing chamber (10), and generally the plant (100) as a whole, is covered by a metal layer or casing to improve mechanical integrity thereof and to enable the processing chamber to be hermetically sealed with respect to the external environment.

As described in more detail hereinbelow, the plant (100) further comprises post processing means (200) operatively connected to said gas outlet (50) via gas line (101), wherein the gas products generated in the chamber (10) are processed and cleaned, producing in the process non-gaseous residues. In general, non-gaseous residues are produced by the post-processing means (200), and these residues include one or both of subcategories Residues 1 (R1) and Residues 2 (R2), as hereinbefore described.

Alternatively, the plant (100), in particular the post-processing means (200), may further comprise an afterburner means (300) operatively connected to the outlet (50) via gas line (101) for burning organic or other combustible components in the product gases, without comprising a scrubber means. The post-processing means (200) typically further comprises a suitable energy block or afterburner energy utilisation or generating system (400) operatively connected to the afterburner means (300) downstream thereof. Such energy utilisation systems (400) according to the present invention may include, for example, a boiler and steam turbine arrangement or the like coupled to an electric generator. The energy generated by the afterburner energy utilisation system (400) may be used to power the plant (100) and/or be exported, for example. As described hereinbefore, Residues 1 (R1) is typically precipitated from the afterburner means (300) and from the energy utilization means (400).

The post-processing means (200) further comprises a suitable gas cleaning system (500) downstream of the energy utilisation system (400), which may produce solid waste materials, and/or liquid solutions comprising waste materials, including Residues 2 (R2), which require further processing.

For example, the gas cleaning system (500) may comprise a "dry" gas cleaning system, and may thus include a semi-dry scrubber, into which is fed a suspension of $Ca(OH)_2$ in water for binding the acid gases. Water is subsequently evaporated fully, and thus only gases, products $Ca(OH)_2$, $CaCl_2$, $CaSO_4$, $Ca_3(PO_4)_2$, in powder form, and other dust (which did not precipitate in the boiler) exit the scrubber. After the scrubber there is a reactor-adsorber arrangement, wherein a mixture of powders of $Ca(OH)_2$ and powdered activated carbon (PAC) are fed. These powdered adsorbants have very large specific surface values (typically carbon>750 $m^2$/g; $Ca(OH)_2$>30$m^2$/g), and the $Ca(OH)_2$ may adsorb the remaining acid gases, while the PAC adsorbs dioxins and components containing heavy metals. After the reactor-adsorber there is a fabric filter arrangement where Residues 2 (R2) are precipitated, including $Ca(OH)_2$, active carbon, dioxins, some oxides and salts (which did not precipitate before), and products of reaction ($CaCl_2$, $CaSO_4$, $Ca_3(PO_4)_2$ and other substances). Essentially, gas carrying dust, which includes toxic components such as dioxins, heavy metals and their oxides and salts, is filtered through the layer of dust precipitated in the bags and including adsorbents such as for example $Ca(OH)_2$ and PAC, and the toxic components are adsorbed and thus precipitate out of the carrier gas. The clean gas obtained after filtration is directed to an exhauster and then to the stack for expulsion into the atmosphere. Residues 2 (R2) obtained from such a cleaning system (in particular from the bag filter arrangement) do not include liquid, and thus such systems are known as "dry" cleaning systems. Residues 2 (R2) are very toxic and may include dioxins, compounds of heavy metals and $Ca(OH)_2$, active carbon, some oxides and salts (which did not precipitate previously), products of reaction (such as, for example, $CaCl_2$, $CaSO_4$, $Ca_3(PO_4)_2$ and other substances). However, since this Residue 2 (R2) is hygroscopic (especially the $CaCl_2$ portion thereof), it may absorb water from the water vapour that is generated along with other combustion products, and thus may have a sludge-type consistency. Accordingly, tubes which are used for transporting this Residue 2 (R2) in the gas cleaning system (500) may be optionally heated to enable the Residue 2 to dry.

The post-processing means (200) exemplified in these figures also comprises a suitable stack arrangement (600) for channeling gases from the gas cleaning system (500) to the atmosphere. The stack arrangement (600) comprises suitable monitoring equipment to monitor that the levels of pollutants exhausted therefrom to the atmosphere are within legally acceptable limits.

Thus, the post-processing means (200) generates Residues 1 (R1) and Residues 2 (R2), as described hereinbefore.

In each one of the first, second and third embodiments, the residue recycling means (900) typically comprises one or more reservoirs (950) for temporary storage and accumulation of Residues 1 (R1) and Residues 2 (R2) precipitated by the post-processing means (200), as illustrated schematically in FIGS. 4, 5 and 6, and also in FIGS. 7, 8 and 9.

Residues (R1) and (R2) are usually precipitated by gravity into separate reservoirs (950), which are designated reservoirs (250) and (550), respectively, in FIGS. 7, 8 and 9. The residues are typically discharged continuously through chutes (251), (551), respectively, into conveyor troughs (not shown) comprised in the reservoirs (250) and (550), respectively. In each reservoir, the residue conveyor pulls the settled residue from the bottom of the trough and transports it to an ash hopper, storage bin, roll-off carrier, or dump truck (not shown). The trough is constructed of steel or concrete, and the residue-discharge system usually has two conveyor troughs so that a full standby is available. Having a full standby permits switching between systems for even wear and scheduled maintenance. Preferably, though, suitable auger systems or pumping systems may be used for transporting the residues out of the reservoirs, wherein a liquid medium is used for transportation; for example—spent oil or fuel. Alternatively, steam or compressed air may be used as a transport medium for residue transportation in dust form.

The present invention is characterised in providing a residues recycling system (900) for recycling non-gaseous residues, such as to ensure direct processing thereof at the hotter parts of the processing chamber (10). Referring to FIG. 6, in the third and preferred embodiment of the present invention the residues recycling system (900) comprises both the direct feed system (700) and the indirect feed system (800), substantially as each described herein with respect to the first and second embodiments, respectively, mutatis mutandis.

In the first embodiment of the present invention, and referring to FIG. 7, the residues recycling system (900) is in the form of a direct feed system (700), configured to directly channel at least a part of the residues precipitated in the gas processing means (200) to the hotter lower part (17) of the chamber (10). Similarly, and referring to FIG. 9, the residues recycling system (900) of the third embodiment also comprises a direct feed system (700). Typically, Residues 1 (R1) are first accumulated in the reservoir (250), which is in fluid communication with the hotter lower part (17) of the chamber (10) via a suitable conduit means (710) comprised in the direct feed system (700). Suitable fluid transport means (720) may be used for assisting in the transportation of the residues (R1) from the reservoir (250) to the chamber (10), and may utilize a suitable fluid medium, which may be in gaseous form such as steam, oxygen or air, or in liquid form such as fuel, used oil, liquid waste and so on, as hereinbefore described. Such a fluid medium provided at a suitable high pressure by the fluid transport means (720), which is in fluid communication with the reservoir (250), mixes the residues within the fluid and transports the residues mixture downstream directly to the chamber (10).

Additionally or alternatively, the direct feed system (700) comprises mechanical transport means (730) for transporting the residues to the chamber (10). The mechanical transport means (730) may comprise, for example, a suitable pump such as a screw auger to displace the residues from the reservoir (250) to the lower end of the chamber (10). A suitable fluid may be further provided to the residues, typically while still in the reservoir (250), via fluid reservoir (740) to facilitate the operation of the mechanical transport means (730), which is strategically operatively connected to the conduit means (710).

Figure 10B:
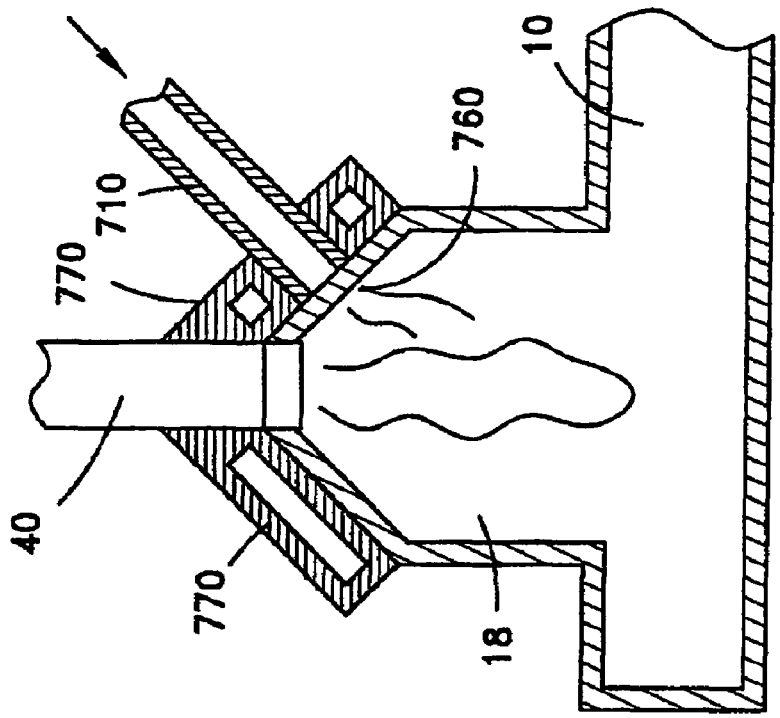
FIG. 10(a) and FIG. 10(b) illustrate in fragmented transverse cross-section view the relative positions of the outlet of the direct feed system and the plasma torches of the embodiments of FIGS. 3 and 5, according to two different processing chamber configurations.
Figure 10A:
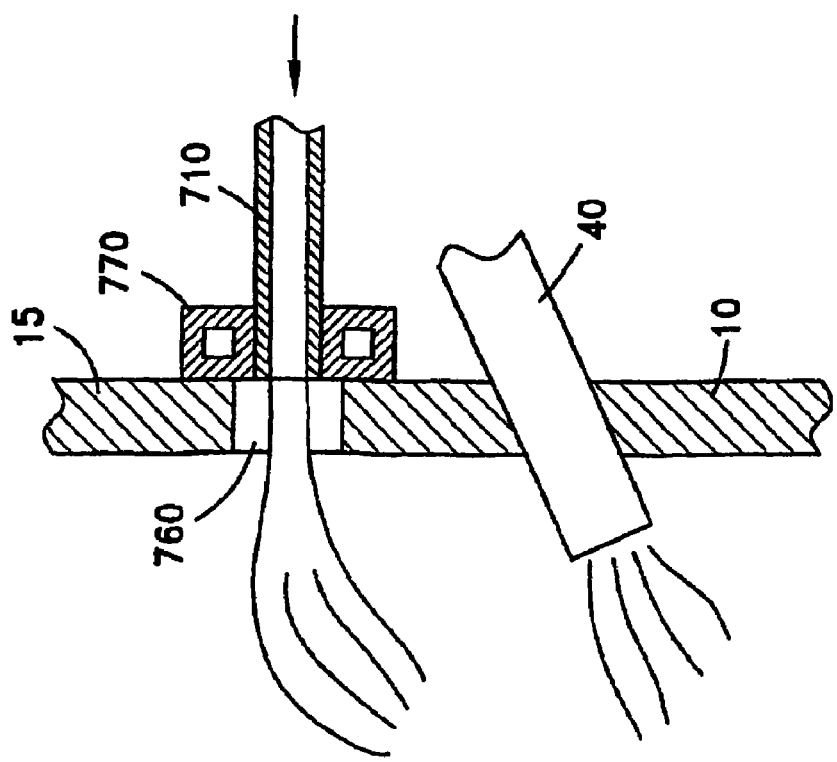

The conduit means (710) comprises one or more outlets (760) located at the lower, hot part (17) of the chamber (10). In particular, the outlets (760) are preferably located a short distance above the plasma jets generated by the plasma torches (40), or otherwise close enough to the jets such that the residues are introduced to as hot a part of chamber (10) as possible. For example, FIG. 10(a) illustrates a fragmented view of a configuration of the chamber (10), wherein the plasma torch (40) is mounted at an angle with respect to a substantially vertical wall (15) thereof, which is made from a refractory material. The outlet (760) of conduit means (710) is located in a plane above but close to the plasma torch (40). In view of the high temperatures in the lower part of the chamber (10), the outlet (760) may comprise a cooling jacket arrangement (770). Alternatively, and as illustrated in FIG. 10(b), in some configurations of the plant (100), the plasma torches (40) may be vertically mounted in side chambers (18) comprised in chamber (10), and the outlet (760) may also be located in the side chamber (18) close to the plume end of the plasma torch (40). As in the embodiment of FIG. 10(a), the outlet (760) may comprise a cooling jacket arrangement (770).

The residues recycling system (900) can also be used, perhaps in a more limited fashion, for recycling Residues 2 (R2), typically produced in the gas cleaning system (500). In all embodiments, the residues recycling system (900) thus preferably comprises a suitable reservoir (550), provided for the temporary storage and accumulation of Residues 2 (R2) precipitated by the gas cleaning system (500), or more generally originating from the post-processing means (200). The reservoir (550) is typically similar to the reservoir (250) as hereinbefore described with respect to Residues 1 (1), mutatis mutandis.

Thus, referring to FIG. 7 and FIG. 9, in the first and third embodiments of the present invention, the direct feed system (700) further comprises a suitable conduit means (520), providing fluid communication between the reservoir (550) and conduit (710), and also preferably comprises suitable pumping means. In this manner, and via conduit (710), the Residues 2 (R2) can be introduced, together with Residues 1 (R1) from reservoir (250), to the lower hotter part of the chamber (10). Alternatively, the conduit means (520) may instead be routed to the reservoir (250), to be mixed with Residues 1 (R1) before proceeding to the conduit means (710). Alternatively, the direct feed system (700) may be configured so as to enable Residues 2 (R2) to be directly introduced to the chamber (10) separate from the Residues 1 (R1), and for this purpose the conduit (520) may be directly connected to the lower part of the chamber (10), in a similar manner to that described for the conduit means (710), mutatis mutandis. Thus, the direct feed system (700) preferably comprises suitable mechanical transport means (not shown) for transporting the Residues 2 (R2) to the chamber (10), and such mechanical transport means may comprise, for example, a suitable pump such as a screw auger to displace the residues from the reservoir (550) to the lower part (17) of the chamber (10). Suitable valve means (560) are provided in the conduit means (520) to control and interrupt the flow of Residues 2 (R2) to the chamber (10) when required. Residues 2 (R2) may be mixed with liquid organic waste, such as for example used engine oil, or liquid fuel, and fed via said direct feed system (700) to the lower part of chamber (10).

In the second embodiment of the present invention, and referring to FIG. 8, the residues recycling system (900) is in the form of an indirect feed system (800), configured to encapsulate the residues in a thermally and mechanically protecting matrix of slag and other additives, and to then channel the encapsulated residues to the chamber (10). Similarly, and referring to FIG. 9, the residues recycling system (900) of the third embodiment also comprises an indirect feed system (800). Typically, the Residues 1 (R1) are first accumulated in the reservoir (250), after precipitation from the gas processing means (200). The indirect feeding system (800) comprises a mixing chamber (820), which is in fluid communication with reservoir (250) via conduit (825). At least part of the residues accumulated in the reservoir (250) are fed to the mixing chamber (820) via gravity or any suitable pumping arrangement (not shown), and the Residues 1 (R1) are mixed in the mixing chamber (820) with an encapsulating material, typically slag and optionally other reagents. Thus the residues are typically mixed with reagents and slag, and encapsulated or glued to form pellets or granules in such a manner such as to prevent their being carried out by gas from the upper part of chamber (10). Such granules make the residues stable not only thermally but mechanically too, and thus affords them greater time to reach the hot zone in the lower part (17) of the chamber (10). In addition, the granules may also interact with different compounds in the chamber (10) as they migrate downwards towards the melting zone, and some volatile materials may react with different compounds in the granules or may form solid solutions. Alternatively, some components may diffuse from the surface into the granules (even in solid form). The terms "granules" and "pellets" are used herein interchangeably, and refer to a mass of material comprising said residues and an encapsulating material, typically slag and/or suitable reagents, herein referred to as "additives", which optionally include one or more adhesive-type materials such as cement or glue, for example. Thus, these additives are characterized by having adhesive properties, that is, they bind together particles of the residues into a matrix, and further, the matrix thus formed does not disintegrate under the conditions found in the upper part of the processing chamber, rather, the matrix is destroyed at the elevated temperatures which are to be found in the lower hotter part of the processing chamber. Such adhesive additives may include, for example any one or combination of cement, sodium silicate, organic compounds including thermoplastics, and inorganic compounds and/or complexes including oxide powders, oxide solutions, salt powders and salt solutions.

Thus the encapsulating material has the function of enabling the residues to be at least partly embedded in it or encapsulated by it, such as to thermally and mechanically stabilize the residues for a sufficient period correlated to the migration time from the upper end to the lower, hotter end of the chamber (10), as will become clearer hereinbelow. Such encapsulating material, hereinafter referred to as additives, may include, for example, cement optionally mixed with water, silica glass (also known as liquid glass or $mNa_2O.nK_2O.fSiO_2$, wherein m, n, f are numerical factors including integers and fractions), or liquid organic waste (including machine oil, for example), or slag, or indeed a mixture of any of these additives. These components may be provided to the mixing chamber (820) via suitable silos or reservoirs (830), by means of conduits (835) and gravity feeds or suitable pumps (not shown). The slag may additionally or alternatively be provided directly from the chamber (10) via reservoir (60), after the slag has been cooled and broken up into suitable sized particles via transportation means (840), which may include a conduit, conveyor arrangement, or vehicular transport, among others.

Typically, slag may be cooled into granules (for example by pouring it out in water from the chamber (10)) and it may then be mixed with reagents and with residue. When slag is poured out into the water, the diameter of granules formed depends on the melt jet mass flow and the diameter of the jet (which depends on chamber's productivity) and may be less then 3 cm. Such a system may also include a rotating drum. When slag with water is poured out onto the drum granules of slag are ejected to different distance depending on their diameter. Granules or particles of slag may also be further crushed before introduction into the mixer (820) if required. Alternatively, the slag granules or particles may be formed by first pouring the molten slag into metal moulds. The moulds may be of a suitable size such that each mould provides a single granule. Alternatively, the mould may be much larger than the desired granule size, and once the slag has cooled and solidified, the granules are formed by mechanically crushing and splitting the solidified slag ingot to provide granules or particles of slag.

The residues are typically encapsulated or are glued to slag by suitable additives. A screw auger system, for example, may take out the mixture of residues and additives, which may be in sludge form, from the mixer (820) into a pellet making machine or granulating means (850), where pellets or granules are subsequently dried by air jets, for example. Some of the residue particles will be encapsulated, while others may be at the surface of the pellets. In any case, they are mechanically bound in the pellets such as to prevent the residue particles in the pellets to be removed from the chamber (10) by product gases. The pellets or granules thus formed may comprise a simple mixture, which is not disintegrated because of the adhesive agent used in forming the matrix. Alternatively, some of the reagents that exist in the mixer (820) may react with the slag and residue during the mixing and subsequent formation of the granules. For example cement (which includes components: $CaO.mSiO_2$; $KCaO.nAl_2O_3$; $fCaO.Al_2O_3.Fe_2fO_3$ and others) may be used, and may thus react with water and may form some compounds and/or complexes with components of residue, which may include the same oxides, resulting in a matrix where the metal oxides are bound and therefore not capable of volatizing until the matrix structure is destroyed by exposure to the high temperature zone in the lower part of the processing chamber.

The volume (Vg) and external surface area (Fg) of the residue granules provided by the granulating means (850) may be advantageously controlled and optimized according to the following criteria, wherein preferably, the volume (Vg) and external surface area (Fg) of the residue granules are chosen such that they satisfy the relationship:—

$$Vg/Fg \geq 0.00002*H$$

wherein H is a predetermined linear distance that is preferably but not necessarily correlated to the travel distance of the residue granules from the upper part of the chamber (10) to the lower, hotter part thereof. Thus, H is advantageously and preferably defined in these embodiments the height of the chamber (10), taken from the center of the gas outlet (50) to the centre of the slag outlet port (61), as exemplified in FIG. 7. Alternatively, H may be defined as the vertical distance taken from the center of the gas outlet (50) to either the nominal or maximum level of the surface of the slag at the lower part (17) of the chamber (10) (marked as (H') in FIG. 7, for example), or alternatively to the hot zone of the lower part (17) provided by the plasma torches (40) (marked as (H'''') in FIG. 7, for example), or alternatively to the center of the output end of one of the plasma torches, preferably of the uppermost plasma torch (marked as (H''') in FIG. 7, for example). or alternatively to the bottom end of the chamber (10) (marked as (H'') in FIG. 7, for example). According to the level of porosity of the residue granules, these may also comprise a corresponding internal surface area.

Thus, the mixture of residues and additives is then fed from the mixing chamber (820) to granulating means (850), to form suitably sized granules or pellets. Thereafter, a suitable transportation system (855) carries the granules to the upper end of the chamber (10), via a waste inlet means comprising an air lock arrangement (30), either via the waste feeding system (20) or directly. (At this point, of course, the granules may additionally or alternatively be stored at a suitable location for future use, and/or transported to a different plant (100) for recycling therein.) The granules are then introduced into the chamber (10) together with other waste from the feeding system (20), or without such waste, and then migrate downwards to the lower hotter part (17) of the chamber (10), as herein described. Thus, the encapsulation of the residues by the additives substantially prevents the residues from prematurely being carried out of the chamber (10) relatively intact, exiting thereof via outlet (50). Rather, some of the encapsulated residues interact with reagents during the downward migration, while other residues are enabled to reach the lower hotter part of the chamber (10).

This embodiment has the added advantage that slag, which is also a fluxing agent, may be continually added to the column of waste, minimizing the risk of congestion therein. Also, the granules provide a certain degree of "porosity" to the column of waste, which is helpful in maintaining a good distribution of heat and temperature gradient in the chamber (10).

Thus, by enabling the recycled residues to be exposed to the high temperature of the hot, lower part (17) of the chamber (10), some oxides contained in the residues which have low melting temperatures may be "absorbed" by other melted material therein. Different oxides may form solutions and new compounds having higher melting temperatures than some of the original components thereof. For example, materials such as pyroxene minerals may be formed, which may include oxides of Na, Ca, Mg, Fe, Al, Cr, Ti and Si in different proportions. Further, reagents (added to the residues and/or the slag that is being recycled (see below)) may form such compositions with slag and/or with the residues being recycled, to allow volatile components to be trapped. Such volatile components may be formed, for example, from the recycling of residues or from the waste, and tends to ascend in the processing chamber in vapour form through the column of waste. In mineral muscovite, $(KAl_2(OH)_2[AlSi_3O_{10}])$, different elements may be replaced therein, for example, K may be replaced with Na, Cs, Ca or Ba; Al may be replaced with Fe, Li, Cr, Mn or V; OH may be replaced with F. Such compositions may trap different toxic components. In such a manner it is possible to include in the slag some heavy metals, such as Cd, Zn, Pb, for example, which were originally in the residues, and thus rendering the same safe for disposal.

Referring to FIG. 8 and FIG. 9, in the second and third embodiments of the present invention, a conduit means (570) and suitable pump means (not shown) enables Residues 2 (R2) to be introduced to the mixing chamber (820) from reservoir (550). In the mixing chamber (820), Residues 2 (R2) may be mixed with additives in a similar manner to that described for Residues 1 (R1), mutatis mutandis, optionally in addition to Residues 1 (R1) from reservoir (250). The conduit means (570) and the conduit (825) may each comprise suitable valves, (828) and (528) respectively, for controlling the flow of Residues 1 (R1) and Residues 2 (R2), respectively, to the mixing chamber (820), thereby enabling the relative amounts of Residues 1 (R1) and Residues 2 (R2) introduced therein to be controlled. Alternatively, the conduit means (570) may instead by routed to the reservoir (250), to be mixed with Residues 1 (R1) before proceeding to the mixing chamber (820) or granulating means (850), and valve means (528) may then be used to control the amount or proportion of Residues 2 (R2) being introduced therein. Alternatively, the indirect feed system (800) may be configured so as to enable Residues 2 (R2) to be directly mixed with additives and then introduced to the chamber (10), separate from the Residues 1 (R1). For this purpose the conduit (570) may be directly connected to a separate mixing chamber, having additive reservoirs in communication therewith, and a granulating means, and a suitable transport means similar but separate to that described herein for the Residues 1 (R1), mutatis mutandis.

In any case, the indirect feed system (800) provides granules that may be fed into the chamber (10) via the upper end, in the same manner as, and typically together with, regular waste. As the granules descend through the increasing temperature zones of the chamber (10), they are correspondingly heated. However, the temperature inside each granule is different from that at its surface. The larger the granule the greater the temperature difference between center and surface of the granule. Similarly, the lower the thermal conductivity of the granule material the greater the temperature difference between center and surface of the granule. Also, for a given material, the greater the porosity thereof, the lower its effective thermal conductivity.

For example, it is known that for a material having the thermal properties of wood (with known humidity), the time (t) in hours required for the center temperature of a sphere (radius (r) in inches) of the material to reach the surface temperature can be given by the following approximate equation for a particular external temperature and physical characteristics of the pellet [*Hazardous Waste* and Solid Waste. Edited by David H. F. Liu, Bela G. Liptak. 2000. Lewis Publishers]:

$$t \approx 0.5 * r^2$$

Thus, this equation indicates that for a wood-like material about one hour is needed for the center of a 3-in diameter pellet to approach the surface temperature. Similar relationships between (t) and (r) may also be derived theoretically and/or empirically for other materials.

Thus, if the granules provided by the indirect feed system (800) are sufficiently large and also have low thermal conductivity (aided in this respect if the granules are also porous) some of the toxic components in the residues may exist relatively intact within the granules while these descend to the hotter parts of the chamber (10). At the same time, relatively small particles of inorganic materials (which may exist in the waste, or alternatively may be added to the waste for the purpose of aiding recycling of residues) may melt at the same level of the chamber (10) as the aforesaid granules. Thus, when volatile components are released from the inside part of the large granules they are able to make contact with the hot surface of the granules or with inorganic particles in the molten state, or even with hot or melted material of the same large granules at their surface, and thus the volatile materials may be subsequently absorbed and/or adsorbed, and may react with the material in contact therewith. Thus, the actual granule size and composition may be important parameters for the efficient recycling of residues, and these parameters may be optimized for each type of chamber (10), typically depending on the residence time of the granules inside the chamber (10). Accordingly, it is advantageous to produce porous granules, and to control the composition and structure of the granules such as to provide at the surface of the granules such composition which may itself trap volatile toxic components.

In each of the three exemplified embodiments, some quantities of Residues 2 (R2) may be accumulated in the gas cleaning system and can not be treated there or indefinitely recycled. This may lead to exceeding the legally acceptable levels of toxic components in the stack (600), and these residues (R2) may be placed in special storage until the composition of the waste being input to the chamber (10) is "cleaner", i.e., with less heavy metals, chlorine and sulphur and so on.

Residues 2 (R2) typically contain $Ca(OH)_2$, $CaCl_2$, $CaSO_4$, $CaCO_3$, $NaOH$, $NaCl$, $Na_2SO_4$, metal oxides, hydroxides and/or sulphides from many metals including heavy metals, dioxins and other materials which are normally inappropriate to be disposed of in land fills. The volume of residue of these materials may be significantly reduced using the system of the present invention by recycling Residues 2 back into the hotter parts of the chamber (10) as described above. Ordinarily, these materials react at relatively low temperatures, say about 200° C., such as those found in the upper part of the chamber (10), to produce HCl and other products which are not desirable.

However, when introduced to the hotter part of the chamber (10) as in the present invention, these materials dissociate to the component elements, and many of the metals may become embedded in the vitrified slag, typically as a solid solution, and thus rendered safe for disposal. Different materials may be included in glasses (such as vitrified slag) in various proportions. For example, such glass may include: Hg (<0.1%); S, Cl, As, Se (<1% or more for special glasses) and oxides of metals: Cr, Ni, Mn, Co, Mo (3-5%); Ti, Cu, F, La, Ce, Cd, Th, Bi, Zr (5-15%); Li, B, Na, Mg, K, Ca, Fe, Zn, Rb, Cs, Sr, Ba, U (15-25%); Al, Si, P, Pb (>25%).

Thus, volatile components such as Cd, Zn, Cl, S, Hg, Pb, among others, contained in Residues 2, may be at least in some measure included in the slag, and thus removed from the eventual residue produced by the plant (100), by providing the Residues 2 directly to the hotter lower part (17) of the chamber (10). The amounts of these metals that can be effectively removed from Residues 2 via the slag, will thus depend on the possibility of the corresponding chemical element to be included in the slag composition, and the relative amounts of slag produced by the plant (100). Thus, there is a limit on how much of these metals can be removed from Residues 2, and therefore, at times the introduction of Residues 2 to the chamber (10) may be slowed down or altogether stopped, to prevent these metals being endlessly recycled within the plant (100).

Further, and unlike Residues 1 (R1), Residues 2 (R2) cannot in normal circumstances be fully recycled. The main reason is that compounds such as $CaSO_4$ and $Na_2SO_4$ again form sulphur oxides in the high temperature zone of the chamber (10), these oxides simply being converted in the gas cleaning system (500) back to $CaSO_4$ and $Na_2SO_4$. Thus, these components of Residues 2 (R2) are not effectively removed by the recycling process, and must be disposed of by different means, for example via the transport means (590). Thus, again, at times the introduction of Residues 2 (R2) to the chamber (10) may be slowed down or altogether stopped, to prevent these materials being endlessly recycled within the plant (100).

As mentioned hereinbefore, Residues 2 (R2) may also contain dioxins, particularly if the original waste processed by the chamber (10) contains PVC. The dioxins are hazardous materials which normally need to be disposed of in a special way, with associated high costs for doing so.

In the present invention, one of the products of treating the residues, including dioxins, is HCl, which is mainly intercepted by the gas cleaning system, but part of which is typically allowed to exhaust to the atmosphere via stack (600). However, there are legal and safety limits to such, and other, emissions, which must be monitored continuously. For example, according to many international standards, for example as defined by the EU and by Germany, the limit (average maximum values in 24 hours, dry basis, 11% $O_2$) for HCl emissions is 10 mg per cubic meter, and for $SO_2$ it is 50 mg per cubic meter. The level of HCl (and other pollutants) may be measured at the stack (600) by suitable sensors (650), and these parameters can be used as control parameters for determining the appropriate feed rate of Residues 2 (R2) to the chamber (10). For example, if the level of HCl measured by sensors (650) exceeds a certain predetermined threshold, this could be indicative of too much Residues 2 (R2) being processed in the chamber (10), and thus the recycling rate of flow of Residues 2 (R2) may be reduced or stopped altogether, until the level of HCl and/or $SO_2$ (or other toxic components) is once again within acceptable limits. Of course, if the level of chlorine and/or sulphur (or other elements that form toxic compounds) still doesn't fall, this could mean that the waste being introduced via feed (20) contains high levels of HCl, and a different correcting action is needed.

In order to control the flow rate of Residues 2 (R2), the valve means (560) (in the first and third embodiments), and the valve means (528) (in the second and third embodiments), are advantageously operatively connected to a suitable controller, such as said controller (150). Said controller (150) is also preferably operatively connected to the sensors (650), as well as other components of the chamber (10) as hereinbefore described.

One of the main advantages—and indeed aims—of the present invention is to introduce into the vitrified slag, by means of recycling of residues, the components including the following heavy metals (Cd, Zn, Pb, Cu, Tl, Hg, Sb, As, Cr, Mn, Ni, V, and other), non-metals Cl, S, P, F (in different compounds). These chemical elements may be found in different components within the residues, depending on the specific technological arrangement of the plant (1), for example as illustrated in FIGS. 2(a), 2(b), 3(a) or 3(b). Some of these components have low boiling points or are destroyed chemically at low temperatures (for example, Hg 356.7° C., $HgCl_2$ 301.8° C., $AsCl_3$ 130° C.; HgO 400° C. destroyed, $Cd(OH)_2$ 300° C. destroyed). Other components have higher boiling points or are chemically destroyed at higher temperatures (for example, As 615-° C., $As_4S_4$ 534° C., Pb 1745° C., $PbCl_2$ 953° C. PbS 1114° C., PbO 1516° C., $NiCl_2$ 970° C., CuO 1026° C. (destruction temperature), $ZnCl_2$, 732° C., Zn 906° C., Cd 766.5° C., $CdCl_2$ 964° C., CdO 900° C.). In the second and third embodiments, the slag is provided by means of the granules or pellets that are introduced into the chamber (10).

However, and optionally, the system (900) according to any one of the first, second or third embodiments of the present invention may further comprise a slag recycling system (990) for directly recycling at least part of the slag formed by the plant (100), and possibly additives as well, into the chamber (10). The slag recycling system comprises a suitable granulating or other converting means for converting at least part of said slag into slag particles, and means for transporting at least a part of said slag particles to a suitable inlet comprised in the cooler part of said at least one processing chamber.

The recycling of slag helps in providing better heating distribution within the chamber (10), and also for trapping volatile components in the waste itself and/or the recycled residues. When large amounts of slag are produced by the chamber (10), part of the slag may be recycled, while the remaining slag may be sold to customers (63). Thus, and referring to FIGS. 4 and 7, 5 and 8, and 6 and 9, the slag recycling system (990) for the first, second and third embodiments, respectively, comprises a suitable conduit (995) operatively connected to the reservoir (60) and adapted for transporting at least part of the slag from the reservoir (60), granulated or otherwise converted to particles of a suitable size, to the top of the chamber (10), in a similar manner to the granules produced and transported by the indirect feed system (800) of the second and third embodiments, as described hereinbefore, mutatis mutandis. Optionally, the slag recycling system (990) may further comprise a mixing chamber (996) operatively connected to the conduit (995) and reservoir (60), wherein additives may be added from an external source (997), to be mixed with the slag and the subsequent mixture granulated as before. Optionally, the slag recycling system may be controlled via control (150).

The volume (Vr) and surface area (Fr) of the slag granules or particles recycled by the slag recycling system (990) may be advantageously controlled according to the following criteria, in which preferably, the volume (Vr) and surface area (Fr) of the slag granules or particles are chosen such that they satisfy the relationship:

$$Vr/Fr < Vg/Fg$$

wherein (Vg) is the volume and (Fg) is the surface area of the granules or particles produced by the indirect recycling system (800). The slag granules or particles may optionally be provided from other waste processing plants.

While the residues recycling system according to the present invention is best incorporated as an integral part of a plasma-type waste converting or processing apparatus, the residues recycling system of the present invention is also retrofittable on many existing plasma-based waste processing apparatuses, according to individual circumstances.

While the residues recycling system according to the present invention has been described in the context of a plasma-torch based waste processing plant and is particularly adapted therefor, the residues recycling system is also directed to any other type of waste processing plants which comprise at least one gas outlet means and also a high temperature generating means adapted for providing a high temperature zone in a lower part of said chamber at least sufficient for enabling inorganic waste accommodated therein to be converted into molten slag. Thus, the present invention is also applicable to non-plasma torch based waste processing plants. Such plants may include, for example, processing plants in which waste, such as municipal sewage waste, plus coke or coal is supplied to the processing chamber via a top end thereof, and oxygen is provided via a lower end of the chamber, providing intense heat sufficient for the conversion of inorganic waste to molten slag. Another example includes the type of processing plant in which MSW is fed to the processing chamber via an upper end thereof, and hot air, preheated oxygen and fuel gases are provided via a lower end of the chamber, providing intense heat sufficient for the conversion of inorganic waste to molten slag. In these plants, product and waste gases, including residues, exit the processing chamber via one or more gas outlets.

While in the foregoing description describes in detail only a few specific embodiments of the invention, it will be understood by those skilled in the art that the invention is not limited thereto and that other variations in form and details may be possible without departing from the scope and spirit of the invention herein disclosed.

The invention claimed is:

1. A residues recycling system for recycling at least part of the residues formed in a waste processing plant, said waste processing plant having:
   at least one waste processing chamber adapted for accommodating a column of waste and for enabling said waste to migrate through the chamber in a downstream direction, said chamber having at least one upstream gas outlet means and further having high temperature generating means adapted for providing a high temperature melting zone in a downstream part of said chamber and a relatively cooler upstream gasification zone, wherein said melting zone is at conditions at least sufficient for enabling substantially all inorganic waste therein to be melted into at least one of melted metals and slag, and wherein said upstream gasification zone is at conditions sufficient for enabling gasification of organic waste in said column of waste;
   at least one post processing means operatively connected to said at least one waste processing chamber, wherein said post-processing means are adapted for enabling said residues to be collected therefrom during operation of said at least one waste processing chamber;
   wherein said residues recycling system is characterized in being adapted for introducing at least a portion of said residues into the lower part of said processing chamber such that during operation of said system said portion of said residues is directly exposed to said high temperature melting zone provided by said high temperature generating means.

2. A residues recycling system as claimed in claim 1, wherein said recycling system comprises at least one collection reservoir operatively connected to said post processing means and adapted for collecting at least part of the residues therefrom.

3. A residues recycling system as claimed in claim 1, wherein said residues comprise at least two types of residues, including residues 1 and residues 2 which differ one from the other in at least their chemical properties, that are separately collectible from said post processing means, and said system comprises at least one said collection reservoir for separately collecting one or another of said residues 1 and residues 2.

4. A residues recycling system as claimed in claim 2, wherein said recycling system comprises suitable conduit means for providing communication between said at least one collection reservoir and said lower part of said at least one processing chamber, said conduit means adapted for transporting said residues from said at least one collection reservoir to said lower part of said at least one processing chamber for direct exposure of said residues to said hot zone during operation of said system.

5. A residues recycling system as claimed in claim 4, wherein said system further comprises suitable transport means operatively connected to said at least one collection reservoir for assisting transportation of said residues through said conduit means.

6. A residues recycling system as claimed in claim 5, wherein said transport means comprises a suitable fluid medium for transporting the said residues.

7. A residues recycling system as claimed in claim 4, wherein said system further comprises suitable mechanical transport means operatively connected to said at least one collection reservoir for assisting transportation of said residues through said conduit means.

8. A residues recycling system as claimed in claim 7, wherein said transport means comprises a suitable pump for transporting the said residues.

9. A residues recycling system as claimed in claim 4, wherein said conduit means comprises at least one suitable outlet operatively connected to said lower part of said processing chamber.

10. A residues recycling system as claimed in claim 3, wherein said conduit means comprises at least one suitable valve operable to enable the flow of at least a portion of said residues through said conduit means to be selectively prevented or allowed.

11. A residues recycling system as claimed in claim 10, wherein said valve is operatively connected to a suitable control system.

12. A residues recycling system as claimed in claim 11, wherein said control system is further operatively connected to at least one suitable sensor comprised in said post processing means and adapted for controlling the operation of said valve according to predetermined conditions sensed by said sensor.

13. A residues recycling system as claimed in claim 1, wherein said recycling system comprises a source of suitable additives and a suitable mixer for mixing at least a portion of said residues with said additives, said additives adapted for at least partially encapsulating said portion of residues in a matrix that is thermally and mechanically stable at temperatures substantially similar to the temperature of the gasification zone of said processing chamber, first granulating means for granulating said matrix into residue granules, and means for transporting said residue granules to a suitable inlet comprised in a part of said at least one processing chamber that is cooler than the melting zone thereof.

14. A residues recycling system as claimed in claim 13, wherein said additives may be chosen from any one or combination of cement, sodium silicate, organic compounds including thermoplastics, and inorganic compounds and/or complexes including oxide powders, oxide solutions, salt powders and salt solutions.

15. A residues recycling system as claimed in claim 13, wherein said inlet is a waste inlet for enabling waste to be input into said at least one processing chamber.

16. A residues recycling system as claimed in claim 13, wherein said additives comprise at least part of said slag, and further comprising means for introducing at least part of said slag into said mixer.

17. A residues recycling system as claimed in claim 16, further comprising suitable transport means for transporting slag produced by said at least one processing chamber to said mixer.

18. A residues recycling system as claimed in claim 13, wherein said system further comprises suitable transport means operatively connected to said at least one collection reservoir for assisting transportation of said residues.

19. A residues recycling system as claimed in claim 18, wherein said transport means comprises a suitable fluid medium for transporting the said residues at least to said mixer.

20. A residues recycling system as claimed in claim 13, wherein said system further comprises suitable mechanical transport means operatively connected to said at least one collection reservoir for assisting transportation of said residues at least to said mixer.

21. A residues recycling system as claimed in claim 20, wherein said transport means comprises a suitable pump for transporting the said residues.

22. A residues recycling system as claimed in claim 13, further comprising at least one suitable valve operable to enable the flow of at least a portion of said residues to said mixer to be selectively prevented or allowed.

23. A residues recycling system as claimed in claim 22, wherein said valve is operatively connected to a suitable control system.

24. A residues recycling system as claimed in claim 23, wherein said control system is further operatively connected to at least one suitable sensor comprised in said post processing means and adapted for controlling the operation of said valve according to predetermined conditions sensed by said sensor.

25. A residues recycling system as claimed in claim 13, wherein the volume (Vg) and external surface area (Fg) of at least a portion of said residue granules are chosen such that:

$$Vg/Fg \geq 0.00002*H$$

wherein H is a predetermined linear distance that is correlated to the travel distance of the residue granules from the upper part of the processing chamber to the lower part thereof.

26. A residues recycling system as claimed in claim 25, wherein H comprises the height of the said processing chamber taken from the center of the said gas outlet to the centre of a slag outlet port comprised in said lower part and adapted for enabling the molten slag to exit the said processing chamber.

27. A residues recycling system as claimed in claim 25, wherein H comprises the vertical distance taken from the center of the said gas outlet to a nominal level of the surface of the molten slag at the said lower part of the said chamber 28. A residues recycling system as claimed in claim 25, wherein H comprises the vertical distance taken from the center of the said gas outlet to said high temperature zone of said lower part of said processing chamber.

29. A residues recycling system as claimed in claim 25, wherein said processing chamber comprises at least one plasma torch means and H comprises the vertical distance taken from the center of the said gas outlet to the center of the output end of said at least one plasma torches means.

30. A residues recycling system as claimed in claim 1, wherein said high temperature generating means comprises at least one plasma torch means comprising an output end extending into a downstream part of said waste processing chamber said at least one plasma torch means adapted for providing a high temperature melting zone in a downstream part of said chamber at least sufficient for enabling substantially all inorganic waste accommodated therein to be melted.

31. A residues recycling system as claimed in claim 1, further comprising a slag recycling system for at least part of the slag formed in a waste processing plant and subsequently cooled and solidified after extraction therefrom, wherein said slag recycling system comprises a suitable converting means for converting at least part of said solidified slag into slag particles, and means for transporting at least a part of said slag particles to a suitable inlet comprised in the cooler part of said at least one processing chamber.

32. A residues recycling system as claimed in claim 31, wherein said inlet is a waste inlet for enabling waste to be input into said at least one processing chamber.

33. A residues recycling system as claimed in claim 31, further comprising means for introducing suitable additives into said converting means.

34. A residues recycling system as claimed in claim 31, wherein the volume (Vr) and surface area (Fr) of at least a portion of said slag particles are chosen such that:

$$Vr/Fr<Vg/Fg$$

wherein (Vg) is the volume and (Fg) is the external surface area of the residue granules provided by said recycling system.

35. A residues recycling system as claimed in claim 1, wherein at least a portion of said slag may be removed from said chamber and subsequently cooled to provide solidified fused slag.

36. A residues recycling system as claimed in claim 1, wherein said conditions in said melting zone provided by said high temperature generating means are sufficient such that said melting zone is also a vitrification zone.

37. A residues recycling system as claimed in claim 36, wherein at least a portion of said slag may be removed from said chamber and subsequently cooled to provide solidified vitrified slag.

38. A waste processing plant comprising:
at least one waste processing chamber adapted for accommodating a column of waste and for enabling said waste to migrate through the chamber in a downstream direction, said chamber having at least one upstream gas outlet means and further having high temperature generating means adapted for providing a high temperature melting zone in a downstream part of said chamber and a relatively cooler upstream gasification zone, wherein said melting zone is at conditions at least sufficient for enabling substantially all inorganic waste therein to be melted into at least one of melted metals and slag, and wherein said upstream gasification zone is at conditions sufficient for enabling gasification of organic waste in said column of waste;

at least one post processing means operatively connected to said at least one waste processing chamber, wherein said post-processing means are adapted for enabling said residues to be collected therefrom during operation of said at least one waste processing chamber; and characterized in further comprising a residues recycling system as defined in claim 1.

39. A waste processing plant as claimed in claim 38, wherein said post-processing means comprises a suitable afterburner, a suitable energy utilization means, a suitable gas cleaning system and a suitable stack operatively connected in series to said processing chamber.

40. A waste processing plant as claimed in claim 38, wherein said post-processing means comprises a suitable afterburner, a combustion products cooling system, a suitable gas cleaning system and a suitable stack operatively connected in series to said processing chamber.

41. A waste processing plant as claimed in claim 38, wherein said post-processing means comprises a suitable gas cleaning system, a suitable energy utilization means and a suitable stack operatively connected in series to said processing chamber, and further comprises a waste water treatment system operatively connected to said gas cleaning system.

42. A waste processing plant as claimed in claim 38, wherein said post-processing means comprises a suitable gas cleaning system and a waste water treatment system operatively connected to said gas cleaning system, and wherein said gas cleaning system is adapted for channeling clean fuel gases therefrom to an external user.

43. A waste processing plant claimed in claim 38, wherein said high temperature generating means comprises at least one plasma torch means comprising an output end extending into a lower part of said waste processing chamber said at least one plasma torch means adapted for providing a high temperature melting zone in a lower part of said chamber at least sufficient for enabling substantially all inorganic waste accommodated therein to be converted into at least one of molten metal and slag.

44. A method for recycling at least a part of residues formed in a waste processing plant, said waste processing plant having:
at least one waste processing chamber adapted for accommodating a column of waste and for enabling said waste to migrate through the chamber in a downstream direction, said chamber having at least one upstream gas outlet means and further having high temperature generating means adapted for providing a high temperature melting zone in a downstream part of said chamber and a relatively cooler upstream gasification zone, wherein said melting zone is at conditions at least sufficient for enabling substantially all inorganic waste therein to be melted into at least one of melted metals and slag, and wherein said upstream gasification zone is at conditions sufficient for enabling gasification of organic waste in said column of waste;
at least one post processing means operatively connected to said waste processing chamber, wherein said post- processing means are adapted for enabling said residues to be collected therefrom during operation of said at least one waste processing chamber;
wherein said method comprises the steps:
(a) collecting at least part of said residues from a said post processing means; and
(b) introducing at least part of said residues into a said processing chamber such that during operation of said system said residues are exposed to said high temperature melting zone provided by the said high temperature generating means.

45. A method as claimed in claim 44, wherein in step (a), said residues are collected in at least one suitable collection reservoir operatively connected to said post processing means.

46. A method as claimed in claim 45, wherein said residues comprise at least two types of residues, including residues 1 and residues 2 which differ one from the other by at least their chemical properties, that are separately collectible from said post processing means, and wherein in step (a) residues 1 and residues 2 are separately collected in different said collection reservoirs.

47. A method as claimed in claim 45, wherein in step (b), said residues are transported from said at least one collection reservoir to a lower part of said at least one processing chamber for direct exposure of said residues to said hot melting zone during operation of said system.

48. A method as claimed in claim 45, wherein in step (b), suitable additives are mixed with at least a portion of said residues, said additives being adapted for at least partially encapsulating said portion of residues in a matrix that is thermally and mechanically stable at temperatures substantially lower that the temperature of said hot melting zone, said matrix is granulated into suitable residue granules, and said residue granules are transported to a suitable inlet comprised in the cooler part of said at least one processing chamber for introduction into the said at least one processing chamber.

49. A method as claimed in claim 45, wherein the volume ($V_g$) and external surface area ($F_g$) of at least a portion of said residue granules are chosen such that:

$$V_g/F_g \geq 0.00002 * H$$

wherein H is predetermined linear distance that is correlated to the travel distance of the residue granules from the upper part of the processing chamber to the lower part thereof.

50. A method as claimed in claim 47, wherein H comprises the height of the said processing chamber taken from the center of the said gas outlet to the centre of the slag outlet port comprised in said lower part and adapted for enabling the molten slag to exit the said processing chamber.

51. A method as claimed in claim 47, wherein H comprises the vertical distance taken from the center of the said gas outlet to a nominal level of the surface of the molten slag at the said lower part of the said chamber

52. A method as claimed in claim 47, wherein H comprises the vertical distance taken from the center of the said gas outlet to said high temperature zone of said lower part of said processing chamber.

53. A method as claimed in claim 49, wherein said processing chamber comprises at least one plasma torch means and H comprises the vertical distance taken from the center of the said gas outlet to the center of the output end of said at least one plasma torches means.

54. A method as claimed in claim 44, further comprising the step (c) of introducing slag granules to a suitable inlet comprised in the cooler part of said at least one processing chamber for introduction into the said at least one processing chamber, said slag granules being produced by granulating at least a portion of the slag provided by the said processing chamber during operation thereof.

55. A method as claimed in claim 54, wherein the volume ($V_r$) and surface area ($F_r$) of at least a portion of said slag granules are chosen such that:

$$V_r/F_r < V_g/F_g$$

wherein (Vg) is the volume and (Fg) is the external surface area of the residue granules provided in step (b).

56. A method as claimed in claim 54, wherein components of said residues are introduced into slag, which is subsequently removed from said apparatus and subsequently cooled and solidified to trap therein said components.

57. A method as claimed in claim 56, wherein said components include any one or more of Cd, Zn, Pb, Cu, Tl, Hg, Sb, As, Cr, Mn, Ni, V, Cl, 5, P, F, in elemental form or in compounds.

58. A method as claimed in claim 56, wherein conditions in said hot melting zone are such that the said slag is vitrified thereat.

59. A method as claimed in claim 54, wherein components of said residues form solid solutions with said slag, which is subsequently removed from said apparatus and subsequently cooled and solidified to form vitrified slag.

60. A method as claimed in claim 59, wherein said components include one or more of Hg, S, Cl, As, Se and oxides of metals: Cr, Ni, Mn, Co, Mo (3-5%) ; Ti, Cu, F, La, Ce, Cd, Th, Bi, Zr (5-15%) ; Li, B, Na, Mg, K, Ca, Fe, Zn, Rb, Cs, Sr, Ba, U; Al, Si, P, Pb.

* * * * *